US011003378B2

(12) United States Patent
Iyer et al.

(10) Patent No.: US 11,003,378 B2
(45) Date of Patent: May 11, 2021

(54) MEMORY-FABRIC-BASED DATA-MOVER-ENABLED MEMORY TIERING SYSTEM

(71) Applicant: Dell Products L.P., Round Rock, TX (US)

(72) Inventors: Shyamkumar T. Iyer, Austin, TX (US); William Price Dawkins, Lakeway, TX (US); Kurtis John Bowman, Austin, TX (US); Jimmy Doyle Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 16/403,181

(22) Filed: May 3, 2019

(65) Prior Publication Data
US 2020/0348874 A1    Nov. 5, 2020

(51) Int. Cl.
| | |
|---|---|
| *G06F 3/06* | (2006.01) |
| *G06F 13/40* | (2006.01) |
| *G06F 12/10* | (2016.01) |
| *G06F 9/455* | (2018.01) |
| *G06F 13/16* | (2006.01) |

(52) U.S. Cl.
CPC .......... *G06F 3/0647* (2013.01); *G06F 3/0604* (2013.01); *G06F 3/067* (2013.01); *G06F 3/0659* (2013.01); *G06F 9/45558* (2013.01); *G06F 12/10* (2013.01); *G06F 13/1668* (2013.01); *G06F 13/4027* (2013.01); *G06F 2009/45583* (2013.01); *G06F 2212/657* (2013.01)

(58) Field of Classification Search
CPC .... G06F 3/0647; G06F 3/0604; G06F 3/0659; G06F 3/067; G06F 13/4027; G06F 13/1668; G06F 12/10; G06F 9/45558; G06F 2009/45583; G06F 12/0284; G06F 2212/657; G06F 2009/45579
See application file for complete search history.

(56) References Cited

U.S. PATENT DOCUMENTS

| | | | |
|---|---|---|---|
| 2010/0306288 A1 | 12/2010 | Stein et al. | |
| 2011/0087874 A1* | 4/2011 | Timashev | ........... G06F 11/1446 713/100 |

(Continued)

*Primary Examiner* — Larry T Mackall
(74) *Attorney, Agent, or Firm* — Haynes and Boone, LLP

(57) ABSTRACT

A memory tiering system includes a data mover device coupling a memory fabric to a processing system. At each of a plurality of different times, the data mover device receives a data access request for data from a computer context provided by the processing system, retrieves the data based on a compute-context-memory-fabric mapping that maps the compute context to the first memory subsystem, and provides the data to the processing system for use with the computer context. If the data mover device determines that the data has been retrieved and provisioning for use with the compute context above a memory tiering frequency, it moves the data from the first memory subsystem to a second memory subsystem in the memory fabric that includes higher performance memory characteristics, and causes the compute-context-memory-fabric mapping to be modified to provide a modified compute-context-memory-fabric mapping that maps the compute context to the second memory subsystem.

17 Claims, 18 Drawing Sheets

(56) References Cited

U.S. PATENT DOCUMENTS

| | | | |
|---|---|---|---|
| 2011/0197044 A1* | 8/2011 | Sudo | G06F 3/0685 |
| | | | 711/165 |
| 2013/0185531 A1* | 7/2013 | Emaru | G06F 3/0647 |
| | | | 711/162 |
| 2014/0047190 A1 | 2/2014 | Dawkins et al. | |
| 2018/0018379 A1* | 1/2018 | Eda | G06F 16/185 |
| 2019/0361728 A1* | 11/2019 | Kumar | G06F 9/30101 |

* cited by examiner

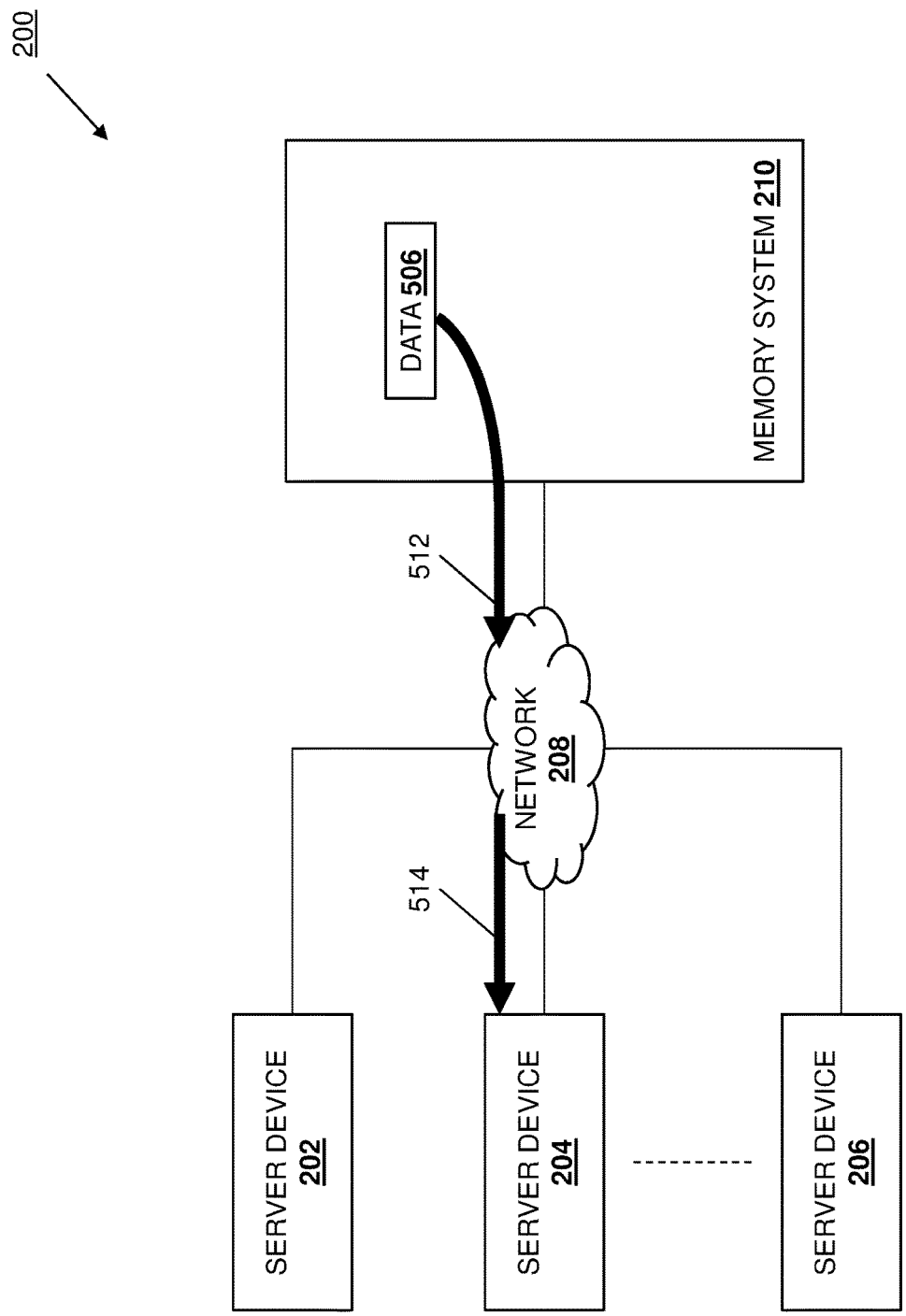

MEMORY-FABRIC-BASED DATA-MOVER-ENABLED MEMORY TIERING SYSTEM

BACKGROUND

The present disclosure relates generally to information handling systems, and more particularly to using a data mover device to provide memory-fabric-based memory tiering for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, sometime utilize memory/storage tiering in order to optimize the operation of the server device. As would be understood by one of skill in the art in possession of the present disclosure, memory tiering provides for the movement of data between tiers of memory subsystems that are available to compute contexts (e.g., virtual machines) provided by server devices, which can provide enhanced operation of those compute contexts. For example, data used regularly by a virtual machine provided by a server device may be moved to memory subsystems that include memory characteristics that provide that virtual machine enhanced access to that data (e.g., the data may be moved to a memory subsystem in the same server device that is providing the virtual machine in order to provide memory access performance increases such as reduced memory access latency and enhanced memory access bandwidth utilization.) Similarly, data used sporadically by the virtual machine provided by the server device may be moved to memory subsystems that include memory characteristics that may provide that virtual machine reduced access to that data (e.g., the data may be moved to a memory subsystem outside the server device that is providing the virtual machine in order to provide room for the more regularly used data in the memory subsystem in that server device.) Such conventional memory tiering operations require the use of network protocols in order to access, copy, and move data that is stored outside the server device that is providing the virtual machine in the examples above, and utilize dedicated software stacks executed by the processing system in the server device in order to perform the memory tiering operations, which requires additional programming in order to enable memory tiering, while occupying processing system cycles that could be utilized for relatively higher value processing operations.

Accordingly, it would be desirable to provide an improved memory tiering system.

SUMMARY

According to one embodiment, an Information Handling System (IHS) includes a data mover processing system; and a data mover memory system that is coupled to the data mover processing system and that includes instructions that, when executed by the data mover processing system, cause the data mover processing system to provide a data mover engine that is configured to: receive, at a plurality of different first times from a first compute context, a first data access request for first data; retrieve, at each of the plurality of different first times from a first memory subsystem that is included in a memory fabric and in response to the first data access request, the first data based on a first-compute-context-memory-fabric mapping that maps the first compute context to the first memory subsystem; provide, at each of the plurality of different first times, the first data for use with the first computer context; determine that the first data has been retrieved and provisioning for use with the first compute context above a first memory tiering frequency over the plurality of different first times and, in response: move the first data from the first memory subsystem in the memory fabric to a second memory subsystem in the memory fabric that includes higher performance memory characteristics relative to the first memory subsystem; and cause the first-compute-context-memory-fabric mapping to be modified to provide a modified first-compute-context-memory-fabric mapping that maps the first compute context to the second memory subsystem.

BRIEF DESCRIPTION OF THE DRAWINGS

FIG. 5F is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
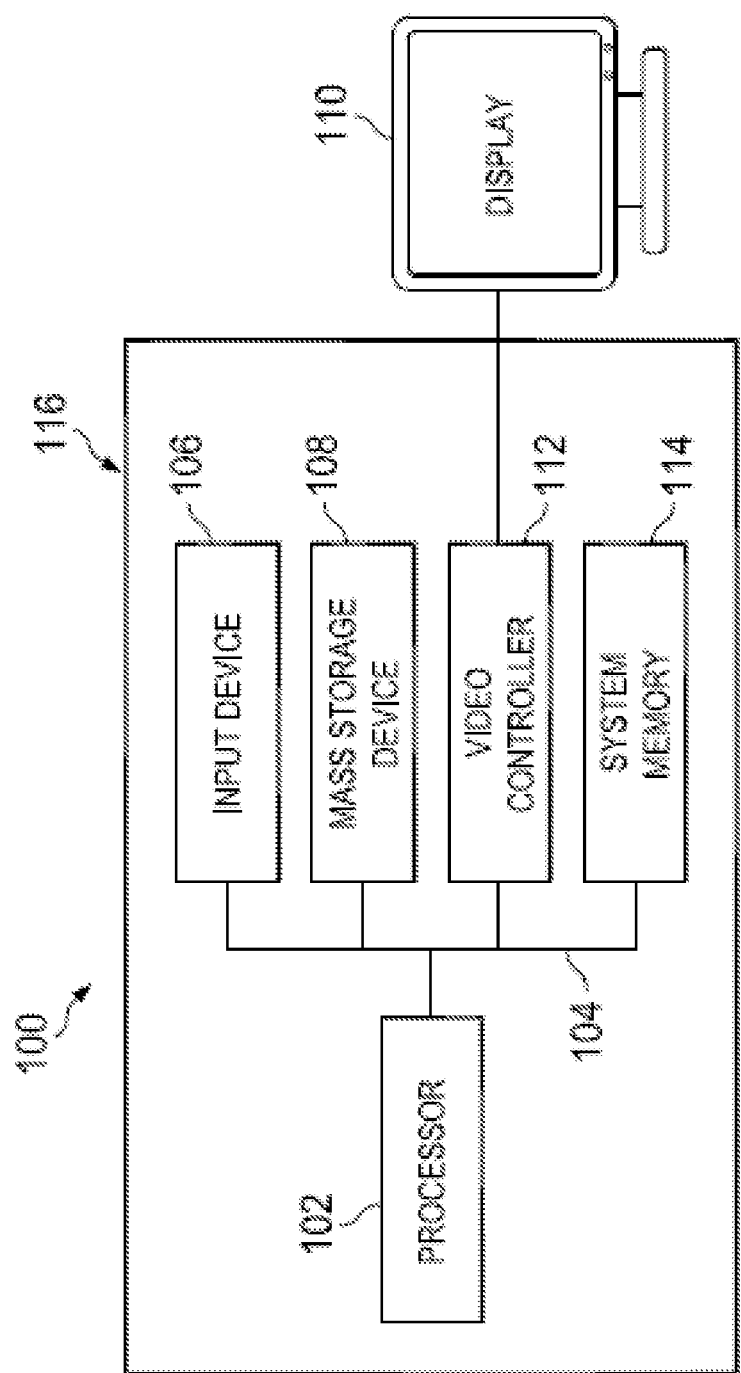
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
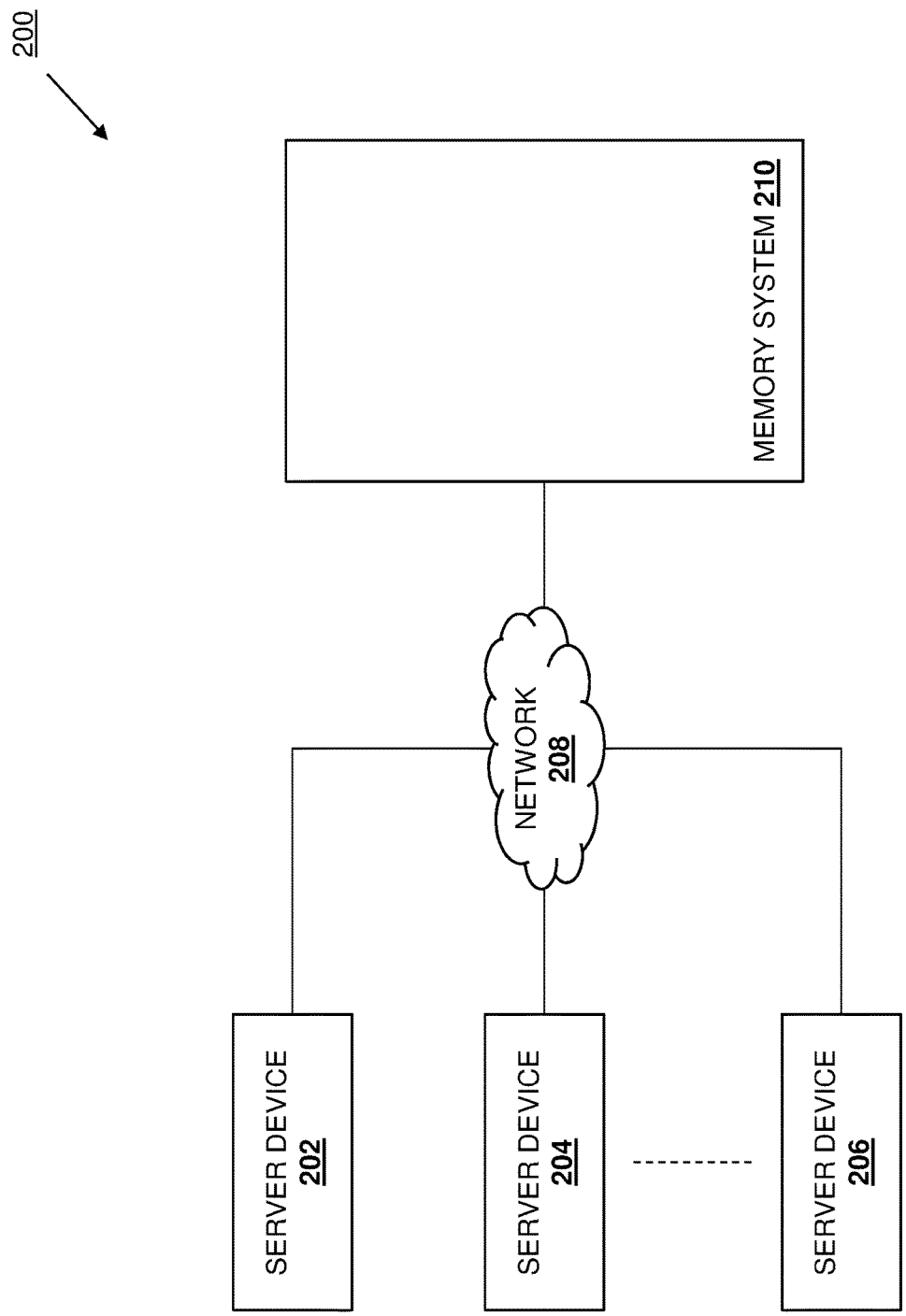
FIG. 2 is a schematic view illustrating an embodiment of a networked system.

Referring now to FIG. 2, an embodiment of a networked system 200 is illustrated. In the illustrated embodiment, the networked system 200 incudes a plurality of server devices 202, 204, and up to 206. In an embodiment, any or all of the server devices 202-206 may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202-206 provided in the networked system 200 may be provided by any devices that may be configured to operate similarly to the server devices discussed below. While only three server devices 202-206 are illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server devices 202-206 are coupled to a network 208 that is included in the networked system 200 and that may be provided by, for example, a Local Area Network (LAN), the Internet, and/or any other network (or combination of networks) that would be apparent to one of skill in the art in possession of the present disclosure. Furthermore, the illustrated embodiment of the networked system 200 includes a memory system 210 that is coupled to the server devices 202-206 via the network 208. In an embodiment, the memory system 210 may be provided by the IHS 100 discussed above with reference to FIG. 1, and/or may include some or all of the components of the IHS 100. In specific examples, the memory system 210 is part of a memory fabric that may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 210 provides a network-connected portion of a memory fabric that includes local memory included in the server device(s) 202-206 (discussed below) and that may be utilized by any of the server devices 202.

For example, the memory fabric may be a Gen-Z memory fabric developed and commercialized by the Gen-Z consortium, and one of skill in the art in possession of the present disclosure will recognize that Gen-Z memory fabrics extend the processing system/memory system byte-addressable load/store model to the entire networked system 200 by decoupling the processing system/compute functionality in the server devices 202-206 from the memory system/media functionality in the memory system(s) that provide that Gen-Z memory fabric, allowing processing systems and memory system to act as peers that communicate using the same language and via simplified, high performance, low latency communication paths that do not incur the translation penalties and software overhead associated with conventional systems, thus eliminating bottlenecks and increasing efficiency via the unification of communication paths and simplification of software required for processing system/memory system communications. As such, in specific examples the network 208 may include Gen-Z switch device(s) and/or Gen-Z bridge device(s) that are configured to provide the server devices 202-206 access to the memory system 210/network-connected portion of the Gen-Z memory fabric. However, one of skill in the art in possession of the present disclosure will recognize that other types of memory fabrics will fall within the scope of the present disclosure as well. Furthermore, while the server devices 202-206 are illustrated as coupled to the memory system 210 via the network 208, one of skill in the art in possession of the present disclosure will recognize that in other embodiments the memory system 210 (or at least a portion of the memory system 210 or memory fabric) may be provided in the server devices 202-206 while still enabling the functionality described below and remaining within the scope of the present disclosure as well. As such, while a specific networked system 200 has been illustrated and described, one of skill in the art in possession of the present disclosure will recognize that the memory-fabric-based data-mover-enabled memory tiering system of the present disclosure may utilize a variety of other components and component configurations while remaining within the scope of the present disclosure as well.

Figure 3:
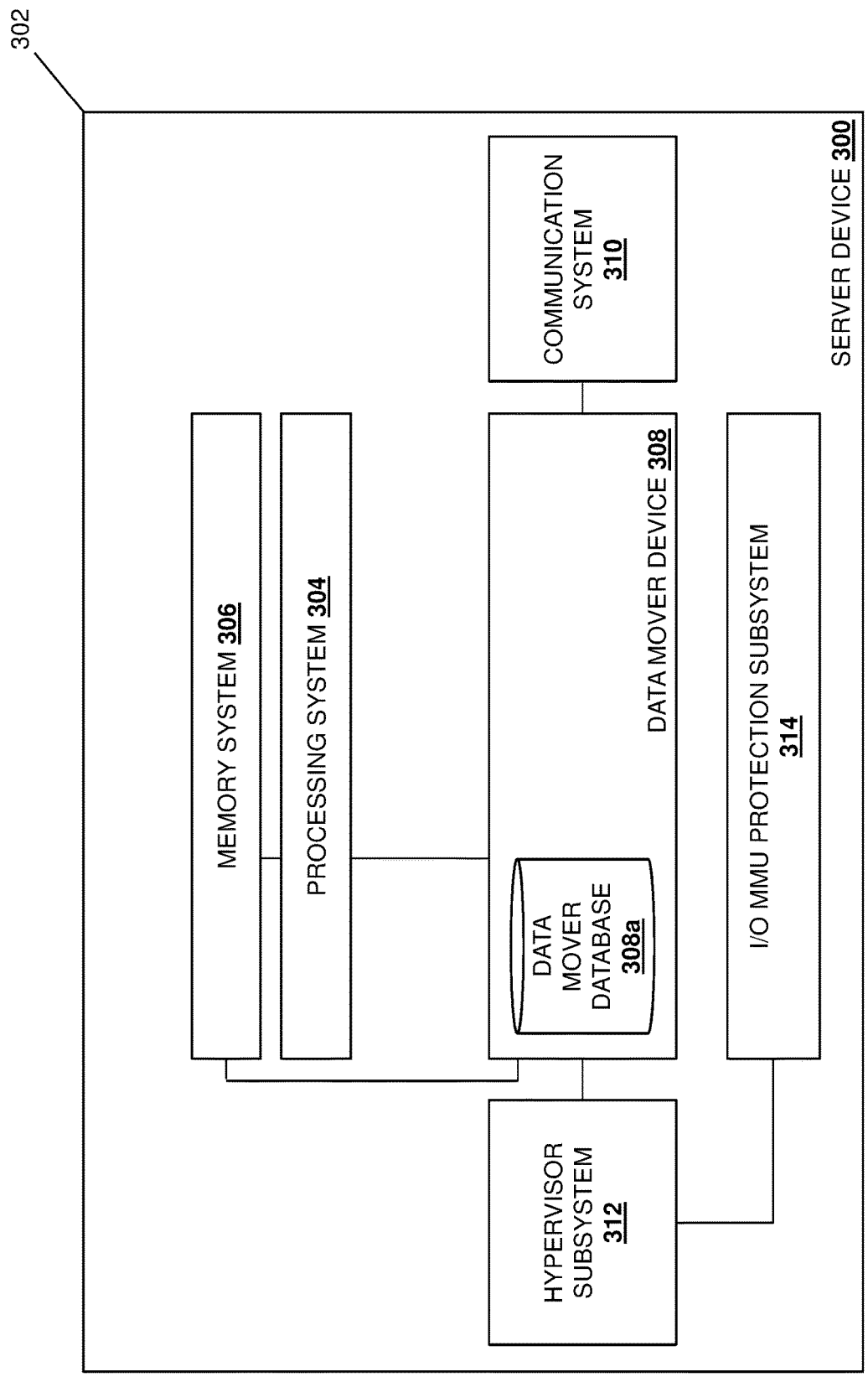
FIG. 3 is a schematic view illustrating an embodiment of a server device that includes the memory-fabric-based data-mover-enabled memory tiering system of the present disclosure.

Referring now to FIG. 3, an embodiment of a server device 300 is illustrated that may provide any of the server devices 202-206 discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly to the server devices discussed below. In the illustrated embodiment, the server device 300 includes a chassis 302 that houses the components of the server device 300, only some of which are discussed below.

For example and as illustrated in FIG. 3, the chassis 302 may house a processing system 304, with the processing system 304 coupled to a memory system 306 that, in the examples provided below, is part of the memory fabric utilized by the memory-fabric-based data-mover-enabled memory tiering system of the present disclosure. In different embodiments, the processing subsystem 304 may include multiple processing subsystems (e.g., cores in a single processor or Central Processing Unit (CPU)), may be one of a plurality of different processing systems in the server device 300 (e.g., in multi-processor systems), and/or combinations thereof. Similarly, in different embodiments, the memory subsystem 306 may be part of a single memory system, provided by different memory systems, and/or combinations thereof. However, while a particular example of a processing system/local memory system configuration is illustrated and described, one of skill in the art in possession of the present disclosure will recognize that a wide variety of processing system/local memory system configurations will benefit from the teachings of the present disclosure as thus will fall within its scope as well.

In some embodiments, the chassis 302 may house a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide a data mover engine in a data mover device 308 that is configured to perform the functionality of the data mover engines and/or data mover devices discussed below. In the illustrated embodiment, the data mover device 308 is illustrated as separate from the processing system 304 and, as such, may be provided by separate data mover hardware and software (e.g., a Field Programmable Gate Array (FPGA) provided on a Peripheral Component Interconnect express (PCIe) card, and/or other subsystem known in the art) that is coupled to the processing system 304. However, in other embodiments, the data mover device 308 may be integrated with, included in, and/or otherwise part of the processing system 304. As such, in those embodiments, the data mover device 308 may be provided by instructions on a local memory system (e.g., the memory system 306) in the server device 300 that is utilized by a CPU-independent portion of the processing system 304, provided as an FPGA that is part of the processing system 304, and/or provided in a variety of manners that would be apparent to one of skill in the art in possession of the present disclosure.

In some examples, the data mover device 308 may appear to the processing system 304 (e.g., a CPU) as a separate, connected PCIe device (regardless of whether that data mover device 308 is provided separately from or as part of that processing subsystem 304). In specific examples, the data mover device 308 may be provided by an architectural data mover that is configured to perform read, write, copy, and/or other data movement operations for the processing system 304 in order to, for example, relieve the processing system 304 from having to use processing cycles to perform those operations. In the illustrated embodiment, the data mover device 308 includes a data mover database 308*a* that may store any of the information utilized by the data mover device 308 as discussed below. However, while illustrated as included in the data mover device 308, one of skill in the art in possession of the present disclosure will recognize that the data mover database 308*a* may be accessible to the data mover device 308 and provided outside the data mover device 308 while remaining within the scope of the present disclosure as well.

In the illustrated embodiment, the chassis 302 houses a communication subsystem 310 that may include a Network Interface Controller (NIC), wireless communication subsystems (e.g., BLUETOOTH®, Near Field Communication (NFC), WiFi, etc.), and/or other communication components that would be apparent to one of skill in the art in possession of the present disclosure. Furthermore, in some of the embodiments of the present disclosure discussed below, the communication system 310 may be configured to provide memory fabric management operations for the server device 300. For example, when the memory fabric is a Gen-Z memory fabric as discussed above, the communication system 310 may include a Gen-Z Memory Management Unit (Gen-Z ZMMU) that, in the example provided below, operates as a Gen-Z ZMMU requester that provides access for the processing system 304 to the Gen-Z memory fabric (e.g., in cooperation with a Gen-Z ZMMU responder in or coupled to the memory system 210). However, one of skill in the art in possession of the present disclosure will recognize that other memory fabric management subsystems for other memory fabrics may be utilized with the teachings of the present disclosure while remaining within its scope as well.

In the illustrated embodiment, the chassis 302 houses a hypervisor subsystem 312 that may be provided by the processing system 304 and that is coupled to the data mover device 308 and an Input/Output Memory Management Unit (I/O MMU) protection subsystem 314. As would be understood by one of skill in the art in possession of the present disclosure, in addition to the functionality discussed below, the hypervisor subsystem 312 may be provided by software, firmware, and/or hardware that may be configured to create and run the virtual machines utilized in the examples discussed below. As such, in the examples discussed below, the server device 300 may be considered a "host machine" upon which the hypervisor subsystem 312 provides virtual machines that operate as "guest machines" on the host machine, while presenting the operating system(s) on the guest machine(s) with a virtual operating platform, and managing the execution of those guest machine operating systems that each share virtualized hardware resources provided via the physical hardware resources in the server device 300. In addition, the hypervisor subsystem 312 may operate to configure the I/O MMU protection subsystem 314, which one of skill in the art in possession of the present disclosure will recognize may be utilized by the hypervisor subsystem 312 in providing access for the guest machines to the memory fabric in the examples discussed below. However, while a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
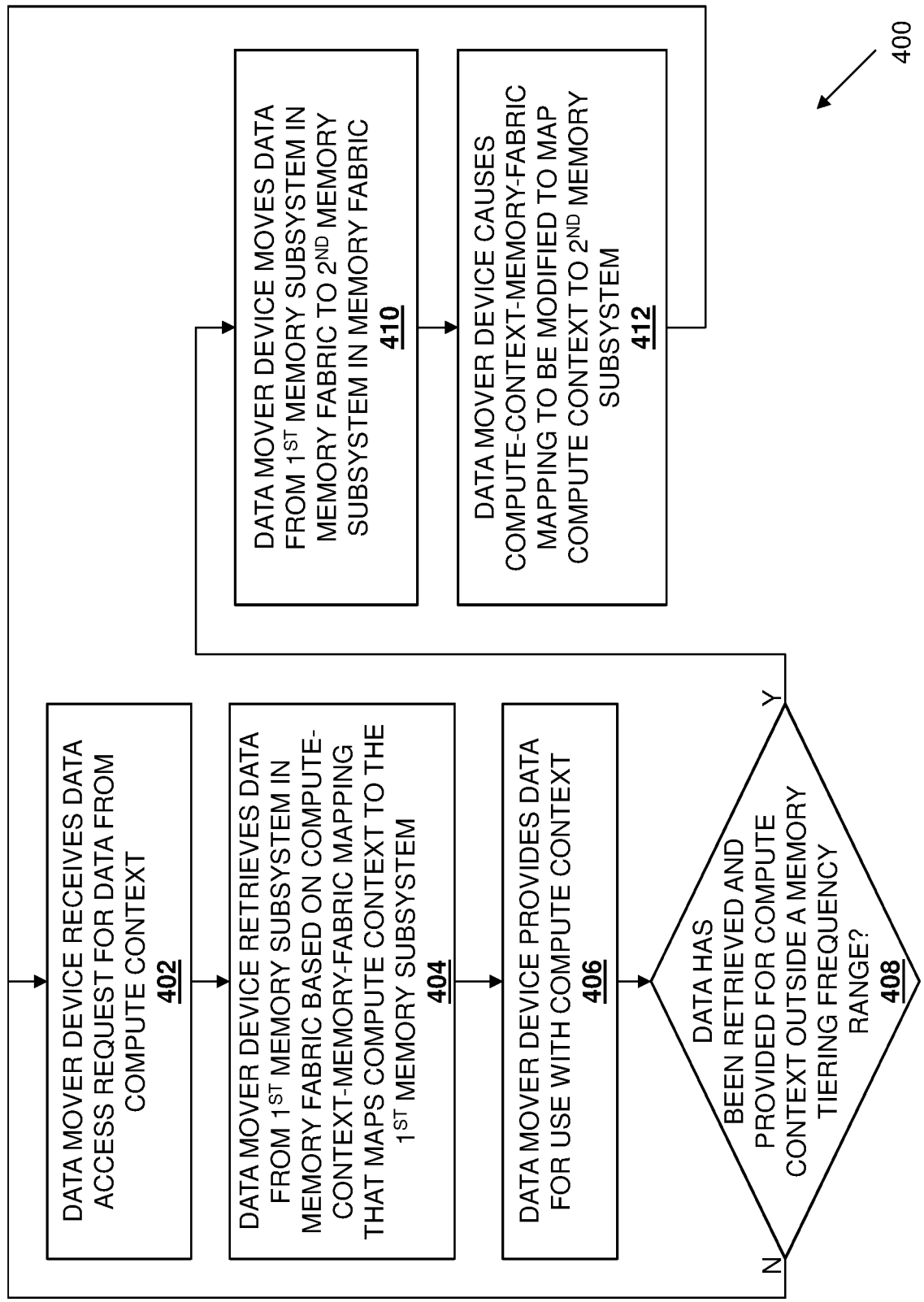
FIG. 4 is a flow chart illustrating an embodiment of a method for using a data mover device to perform memory-fabric-based memory tiering.

Referring now to FIG. 4, an embodiment of a method for using a data mover device to perform memory-fabric-based memory tiering is illustrated. As discussed below, the systems and methods of the present disclosure provide for a data mover device that monitors the retrieval and provisioning of data stored in a first memory subsystem included in a memory fabric to a compute context provided by a processing system in a server device. When the frequency of the retrieval and provisioning of the data stored in the first memory subsystem to the compute context is determined to be outside a memory tiering frequency range, the data mover device may move that data to a different memory subsystem included in the memory fabric. For example, if the frequency of the retrieval and provisioning of the data stored in the first memory subsystem to the compute context is determined to be above the memory tiering frequency range, the data mover device may move that data to a second memory subsystem that is included in the memory fabric and that has higher performance memory characteristics relative to the first memory subsystem (e.g., the second memory subsystem may be provided in a local memory system that is included in the server device and provided for the processing system, while the first memory subsystem is included in a network-attached memory subsystem and, as such, the second memory subsystem may be associated with reduced latency memory access, higher bandwidth memory access, and/or other enhance memory access characteristics known in the art.)

Similarly, if the frequency of the retrieval and provisioning of the data stored in the first memory subsystem to the compute context is determined to be below the memory tiering frequency range, the data mover device may move that data to a second memory subsystem that is included in the memory fabric and that has lower performance memory characteristics relative to the first memory subsystem (e.g., the second memory subsystem may be provided in a network attached memory system, while the first memory subsystem is included in the server device and provided for the processing system and, as such, the second memory subsystem may be associated with increased latency memory access, lower bandwidth memory access, and/or other reduced memory access characteristics known in the art.) The data-mover-enabled memory tiering operations described in the present disclosure do not require the use of network protocols in order to access, copy, and move data that is stored outside the server device, or dedicated software stacks executed by the processing system in the server device in order to perform the memory tiering operations, reducing the amount of programming needed in order to enable memory tiering, and freeing processing system cycles for relatively higher value processing operations.

Figure 5A:
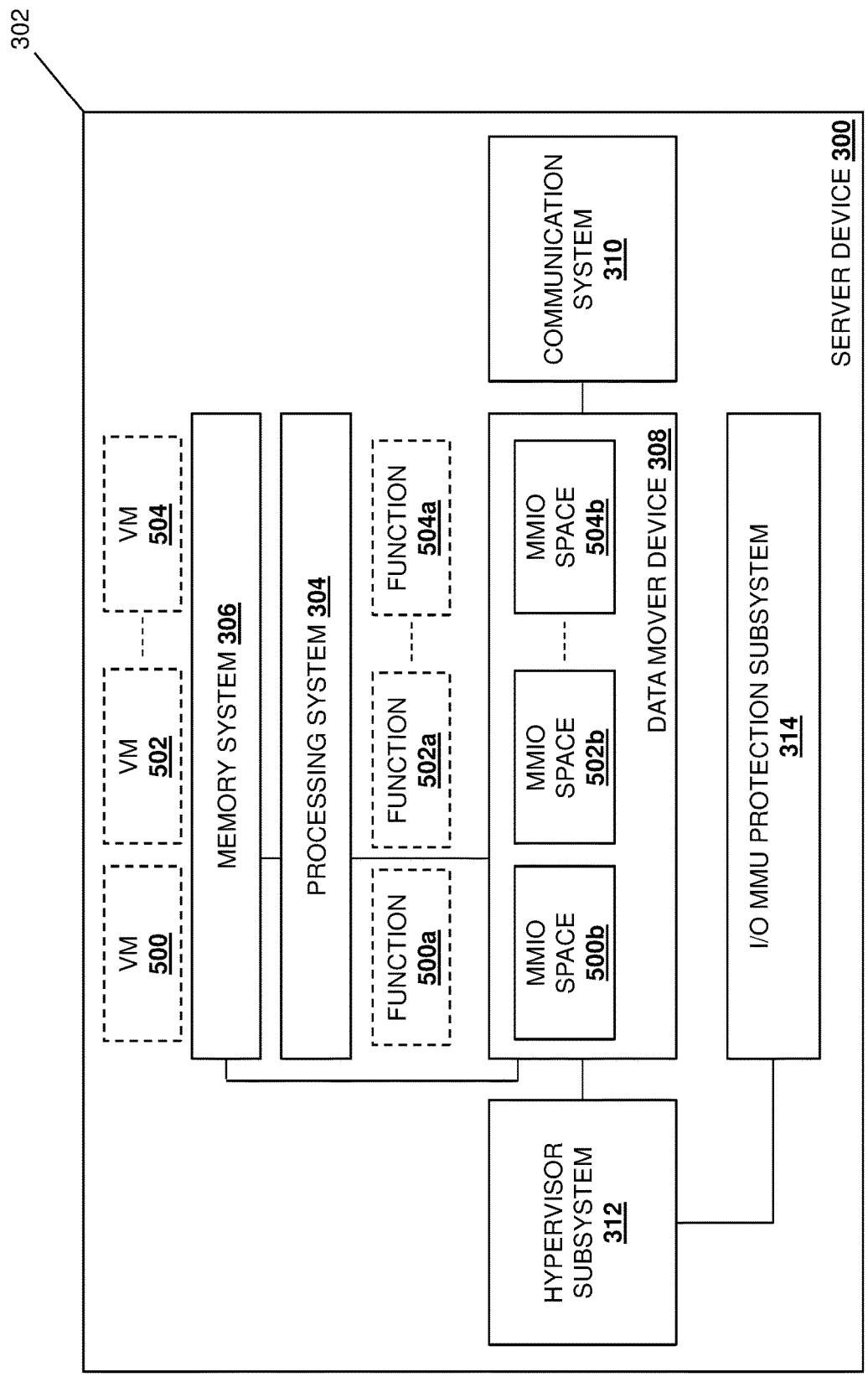
FIG. 5A is a schematic view illustrating an embodiment of the memory-fabric-based data-mover-enabled memory tiering system in the server device of FIG. 3 operating during the method of FIG. 4.

The method 400 begins at block 402 where a data mover device receives a data access request from a compute context. In an embodiment, at or prior to block 402, the processing system 304 may operate to provide a compute context. FIG. 5A illustrates an example of the processing system 304 providing a plurality of compute contexts that, in the illustrated embodiment, include virtual machines (VMs) 500, 502, and up to 504. For example, the processing system 304 may execute instruction stored on the memory system 306 (and/or in other memory locations in the memory fabric of the present disclosure) in order to provide the hypervisor subsystem 312, and the processing system 304 and/or hypervisor subsystem 312 may operate to provide the VMs 500, 502, and up to 504. However, while illustrated and described as VMs, one of skill in the art in possession of the present disclosure will recognize that the processing system 304 may provide other compute contexts such as applications, threads, and/or any of a variety of other compute contexts that would be apparent to one of skill in the art in possession of the present disclosure.

Furthermore, at or prior to block 402 the data mover device 308 may allocate respective data mover functions to the compute contexts provided by the processing system 304. FIG. 5A illustrates an example of the data mover device 308 having allocated functions 500a, 502a, and up to 504a, to the VMs 500, 502, and up to 504, respectively. In a specific example, the functions 500a, 502a, and up to 504a may operate as Peripheral Component Interconnect express (PCIe) functions that are configured to perform data compression, data decompression, data encryption, data decryption, a variety of data manipulation (e.g., multiply-accumulation for artificial intelligence systems, XOR functions for a Redundant Array of Independent Disk (RAID) system, etc.), and/or other PCIe functions that would be apparent to one of skill in the art in possession of the present disclosure. Furthermore, each of the functions 500a, 502a, and up to 504a may be associated with corresponding Memory Mapped Input/Output (MMIO) spaces 500b, 502b, and up to 504b, respectively, that may be available in the data mover device 308 and/or via the memory fabric that is accessed through the data mover device 308, discussed in further detail below. However, while specific components and a component configuration for compute context (VM)/data mover device communication has been illustrated and described, one of skill in the art in possession of the present disclosure will recognize that other components and/or component configurations may enable compute context (VM)/data mover device communications similar to those describe below in order to provide the memory tiering functionality of the present disclosure while remaining within its scope as well.

In an embodiment, at or prior to block 402, the hypervisor subsystem 312 may operate to manage compute-context-memory-fabric mappings that map compute contexts to the memory fabric provided in the memory-fabric-based data-mover-enabled memory tiering system of the present disclosure. For example, the hypervisor subsystem 312 may manage Programmed Input/Output (PIO) window mappings that map the VMs 500, 502, and up to 504 to the MMIO spaces 500b, 502b, and up to 504b, respectively, that are available via the functions 500a, 502a, and up to 504a, allocated to the VMs 500, 502, and up to 504. As such, the hypervisor subsystem 312 may provide (e.g., in the data mover database 308a that is accessible to the data mover device 308) and manage a first-compute-context-memory-fabric mapping that maps first physical address space that defines a first memory subsystem in the memory fabric to first virtual address space (e.g., the MMIO space 500b) that is allocated to the VM 500 (e.g., a first compute context in this example), a second-compute-context-memory-fabric mapping that maps second physical address space that defines a second memory subsystem in the memory fabric to second virtual address space (e.g., the MMIO space 502b) that is allocated to the VM 502 (e.g., a second compute context in this example), and up to a third-compute-context-memory-fabric mapping that maps third physical address space that defines a third memory subsystem in the memory fabric to third virtual address space (e.g., the MMIO space 504b) that is allocated to the VM 504 (e.g., a third compute context in this example)

Figure 5B:
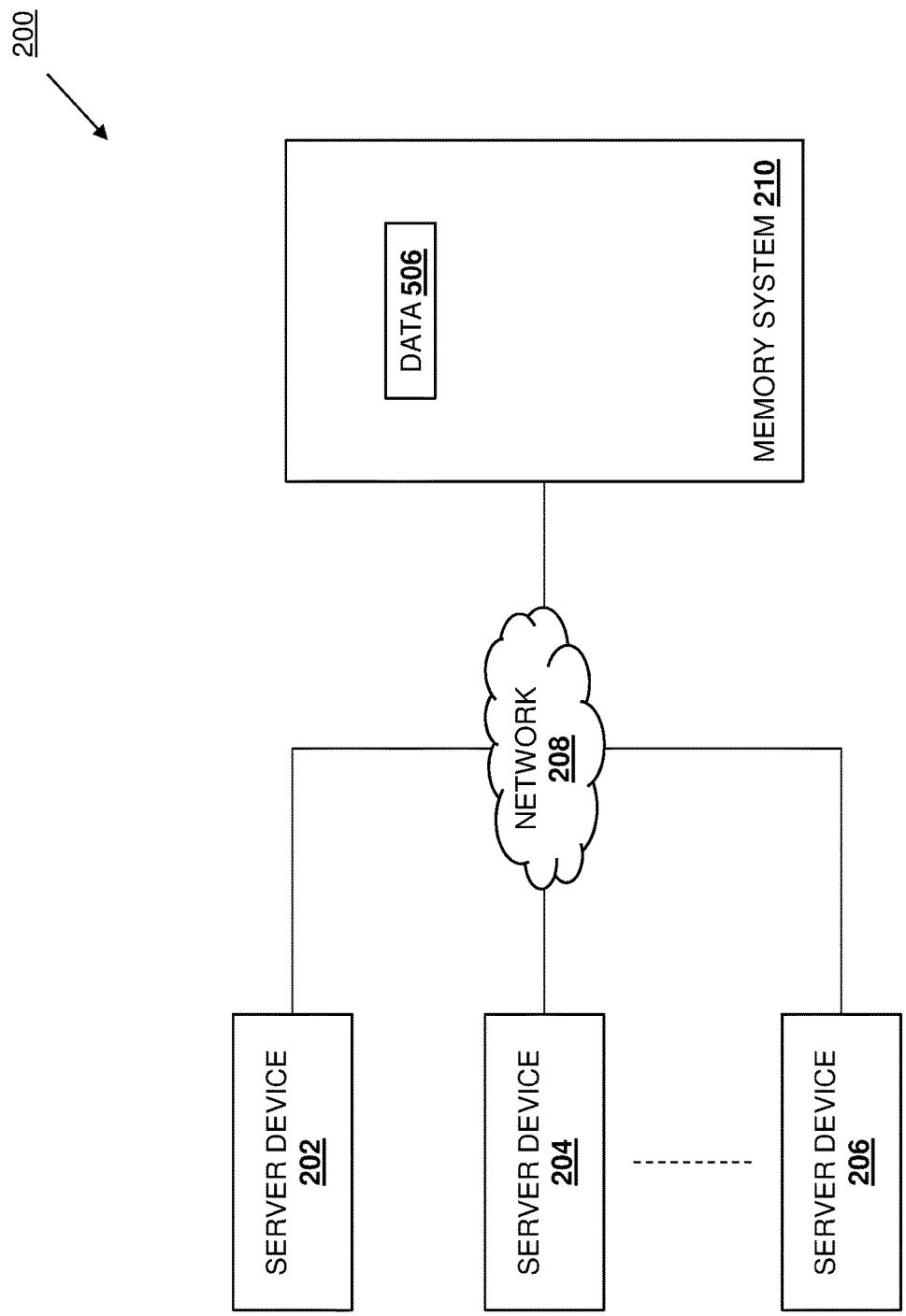
FIG. 5B is a schematic view illustrating an embodiment of the networked system of FIG. 2 operating during the method of FIG. 4.
Figure 5C:
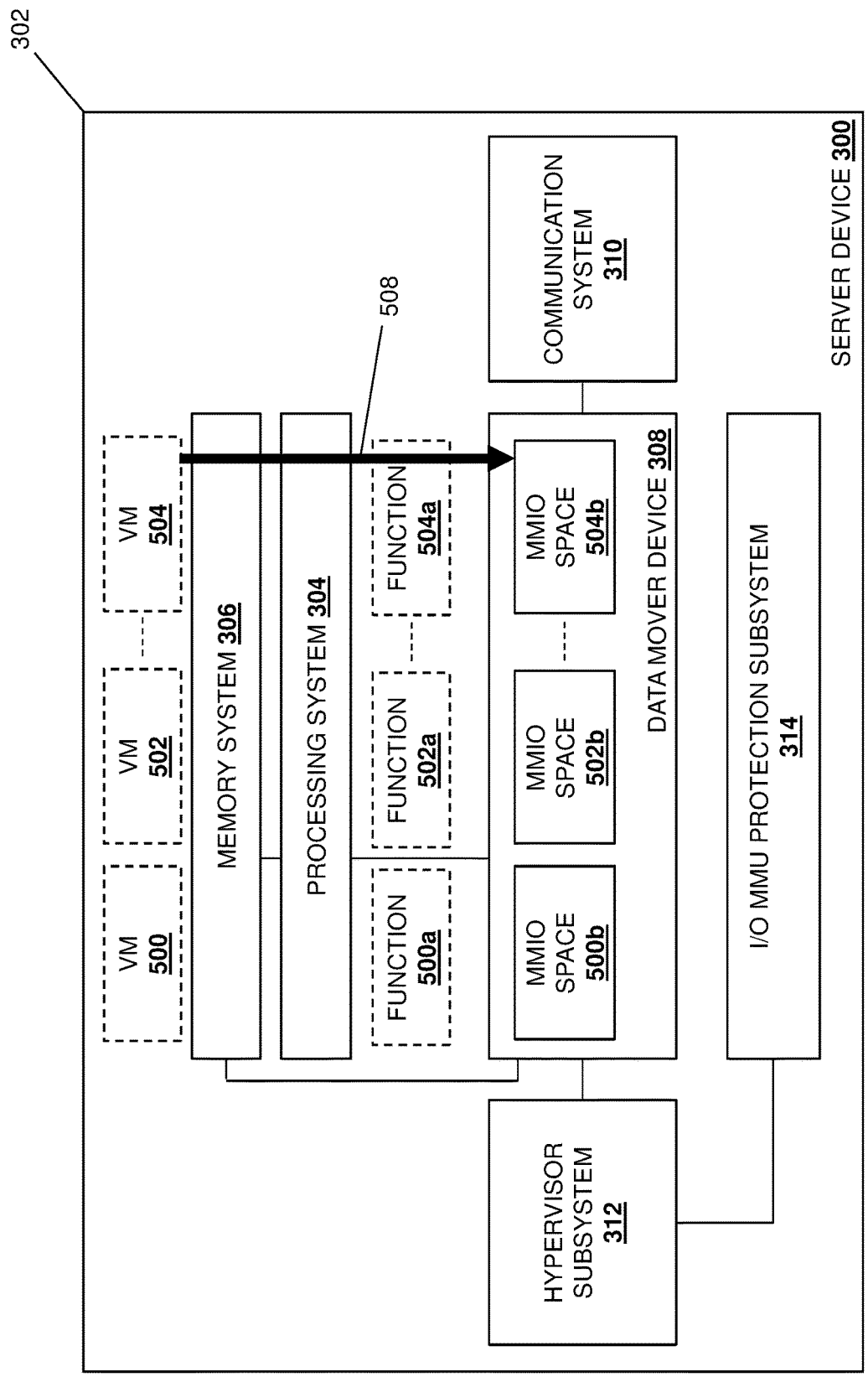
FIG. 5C is a schematic view illustrating an embodiment of the memory-fabric-based data-mover-enabled memory tiering system in the server device of FIG. 3 operating during the method of FIG. 4.

As such, in some embodiments the VMs 500, 502, and up to 504 provided by the processing system 304 may operate to utilize the functions 500a, 502a, and up to 504a and their corresponding MMIO space 500b, 502b, and up to 504b provided via the data mover device 308 to access the memory fabric provided, at least in part, by the memory system 210 and the memory system 306, in order to perform any of a variety of VM operations that would be apparent to one of skill in the art in possession of the present disclosure. For the purposes of the examples provided below, FIG. 5B illustrates data 506 that is stored in the memory system 210 (a "first memory subsystem" in the examples provided below) and utilized with the VM 504 provided by the server device 204/300 during the method 400. While the first memory subsystem discussed in the examples below is illustrated and described as the network-connected memory system 210, one of skill in the art in possession of the present disclosure will recognize that the first memory subsystem in other examples may be any memory subsystem that provides the memory fabric utilized in the present disclosure (e.g., a particular memory device that provides the memory fabric, a physical memory address range in a memory device that provides the memory fabric, etc.) Thus, at block 402, any of the VMs 500, 502, and up to 504 may operate to generate and transmit a data access request. For example, FIG. 5C illustrates the VM 504 provided by the processing system 304 in the server device 204/300 generating and transmitting a data access request 508 to its allocated function 504a via its corresponding MMIO space 504b such that the data access request 508 is received by the data mover device 308 (e.g., via the function 504a.) In the examples provided below, the data access request 508 is a mov instruction that is configured to fetch data from the memory fabric and provide that data in a register (e.g., a CPU register) in the processing system 304, but one of skill in the art in possession of the present disclosure will recognize that data access requests according to the teachings of the present disclosure may request any data known in the art for use with a compute context. As such, the data mover device 308 may receive the data access request 508 via the function 504a and at the MMIO space 504b at block 402.

Figure 5D:
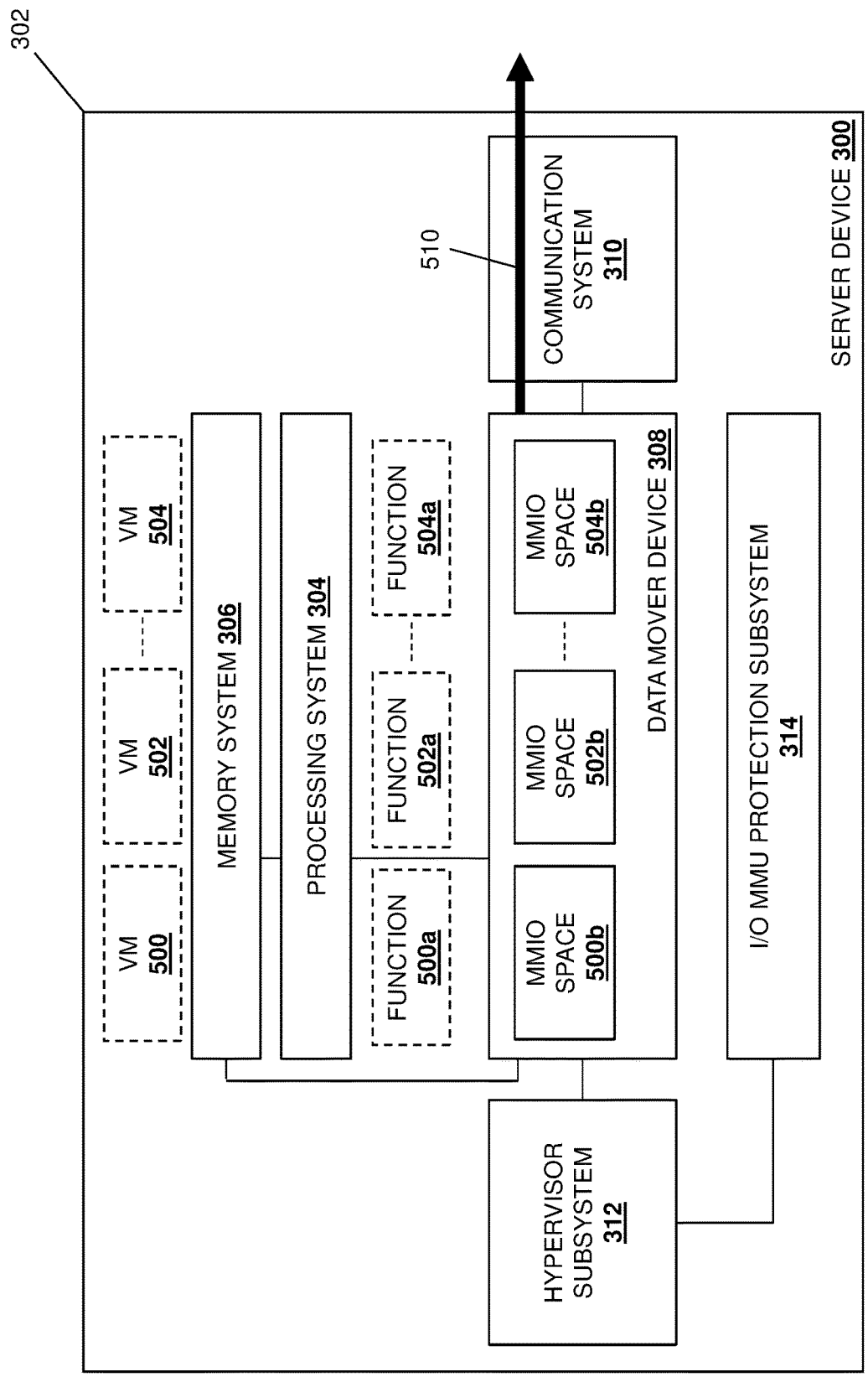
FIG. 5D is a schematic view illustrating an embodiment of the memory-fabric-based data-mover-enabled memory tiering system in the server device of FIG. 3 operating during the method of FIG. 4.
Figure 5E:
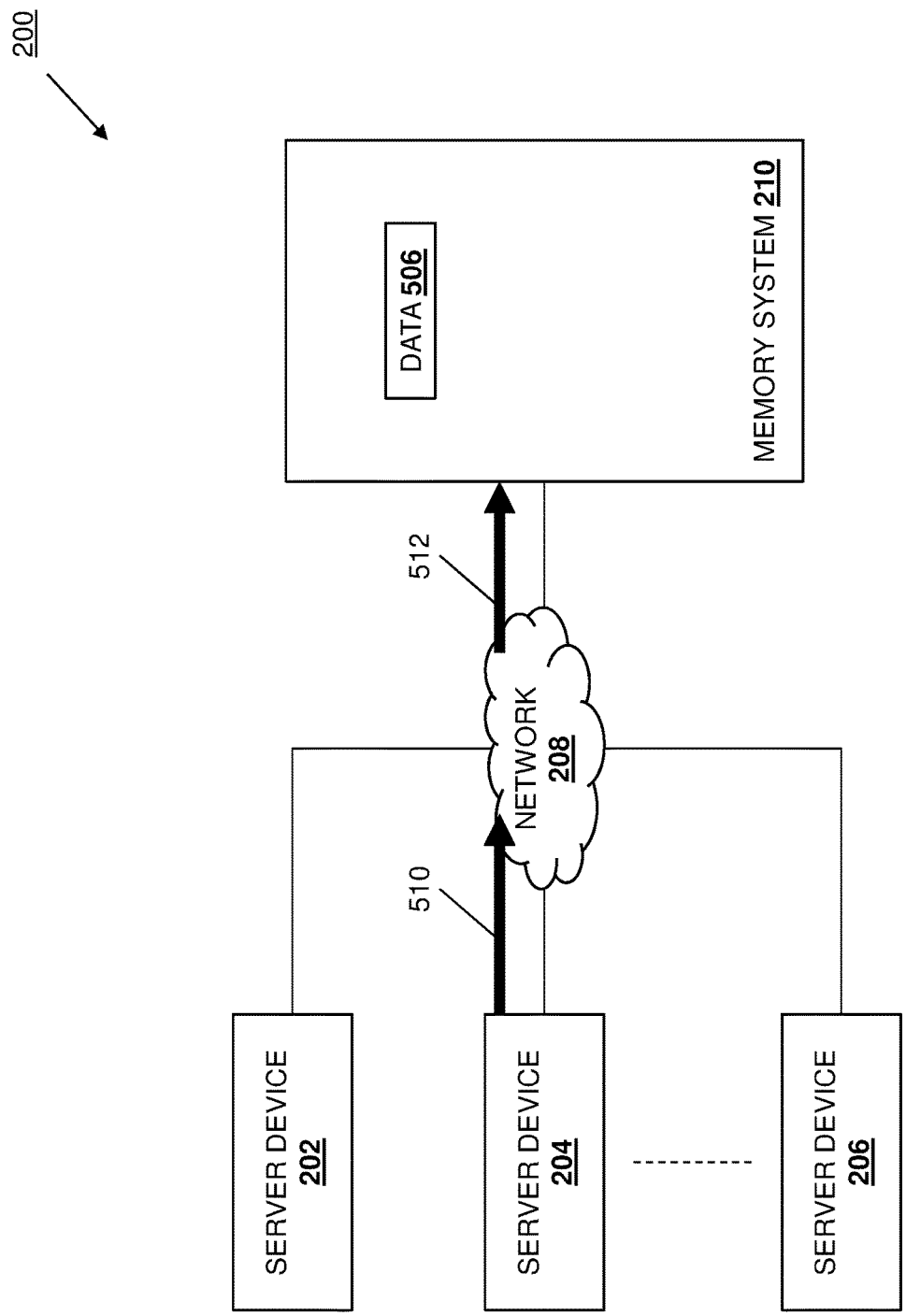
FIG. 5E is a schematic view illustrating an embodiment of the networked system of FIG. 2 operating during the method of FIG. 4.

The method 400 then proceeds to block 404 where the data mover device retrieves data from a first memory subsystem in a memory fabric based on a computer-context-memory-fabric mapping the computer context to the first memory system. In an embodiment, at block 404, the data mover device 308 may operate to retrieve the data requested in the data access request 508 from a first memory location in the memory fabric using the compute-context-memory-fabric mapping provided and managed by the hypervisor subsystem 312 as discussed above. For example, at block 404 the data mover engine in the data mover device 308 may generate a memory fabric request 510 using information in the data access request 508 and the compute-context-memory-fabric mapping for the VM 504, and FIGS. 5D and 5E illustrate the data mover engine in the data mover device 308 issuing the memory fabric request 510 that is transmitted (e.g., via the communication system 510) to the network 208 and that requests the data identified in the data access request 508. In a specific example, the memory fabric request 510 may be a Gen-Z request issued by a Gen-Z ZMMU requester in the communication system 310, although other memory fabric request techniques utilizing other memory fabrics will fall within the scope of the present disclosure as well.

Figure 5G:
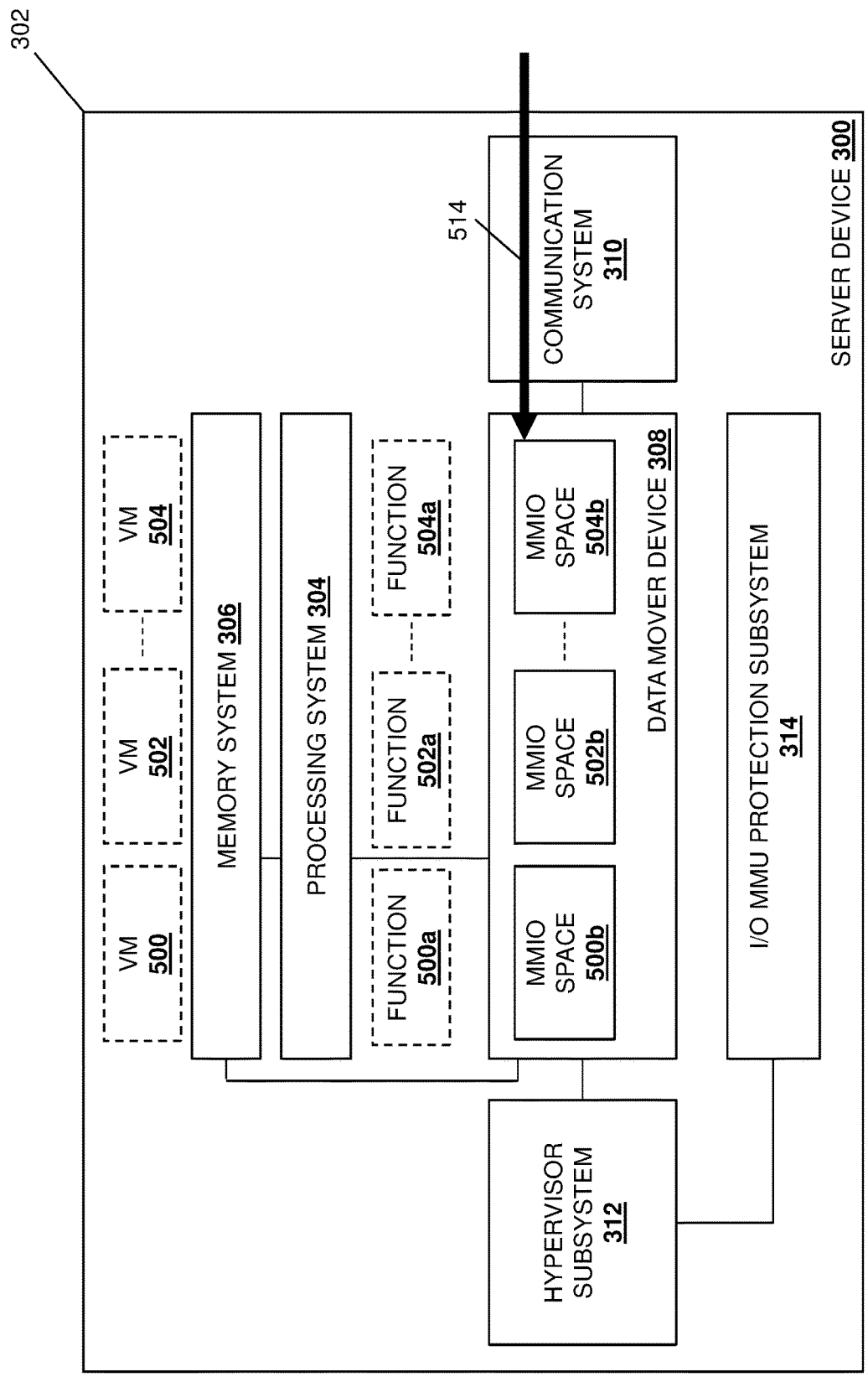
FIG. 5G is a schematic view illustrating an embodiment of the memory-fabric-based data-mover-enabled memory tiering system in the server device of FIG. 3 operating during the method of FIG. 4.

As illustrated in FIGS. 5E, 5F, and 5G, the memory fabric request 510 transmitted to the network 208 may cause the retrieval of the data 506 that is stored in the memory system 210 (a "first memory subsystem") for utilization with the VM 504. For example, a switch device and/or bridge device that provides at least a portion of the network 208 may receive the memory fabric request 510 and in response, perform memory fabric operations 512 that operate to copy the data 506 stored in the memory system 210, and provide that data 506 in a memory fabric response 514 to the data mover device 308. In a specific example, the network 208 may include a Gen-Z switch device and/or Gen-Z bridge device that provides a Gen-Z ZMMU responder that receives the memory fabric request 510/Gen-Z request issued by the Gen-Z ZMMU requester in the communication system 310, utilizes information in the memory fabric request to identify the data 506 being requested, copies that data 506, and provides that data 506 in a Gen-Z response to the communication system 310/Gen-Z requester such that it is provided to the data mover device 308, although other memory fabric response techniques utilizing other memory fabrics will fall within the scope of the present disclosure as well. As such, at block 404, the data mover device 308 may receive the data 506 that was included in the memory fabric response 514 from the Gen-Z requester included in the communication system 310 (e.g., at the MMIO space 504b associated with the function 504a allocated for the VM 504, as illustrated in FIG. 5G), although one of skill in the art in possession of the present disclosure will recognize that other memory fabrics may utilize other memory fabric techniques to provide data in a memory fabric response to the data mover device 308 while remaining within the scope of the present disclosure as well.

Figure 5H:
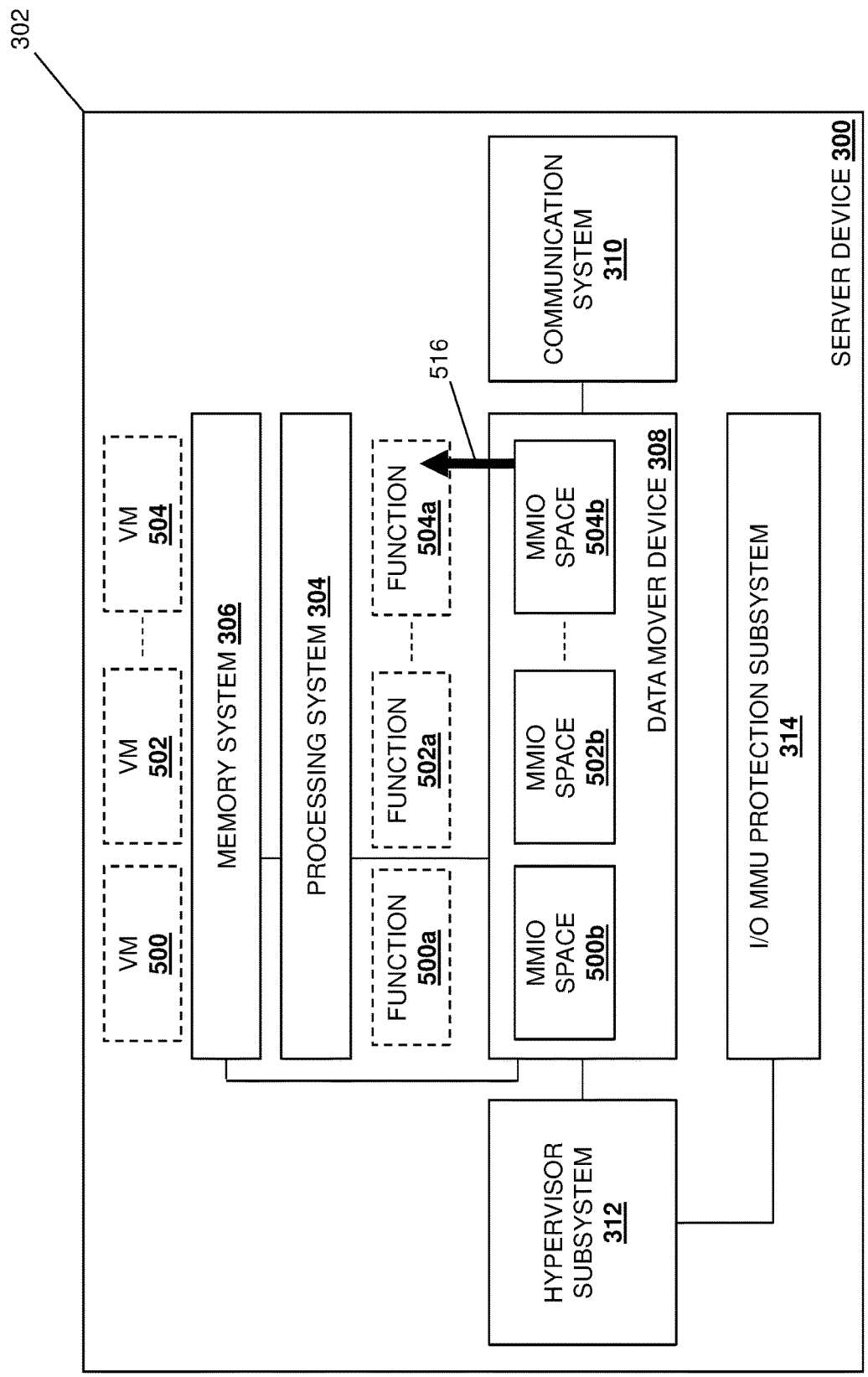
FIG. 5H is a schematic view illustrating an embodiment of the memory-fabric-based data-mover-enabled memory tiering system in the server device of FIG. 3 operating during the method of FIG. 4.
Figure 5I:
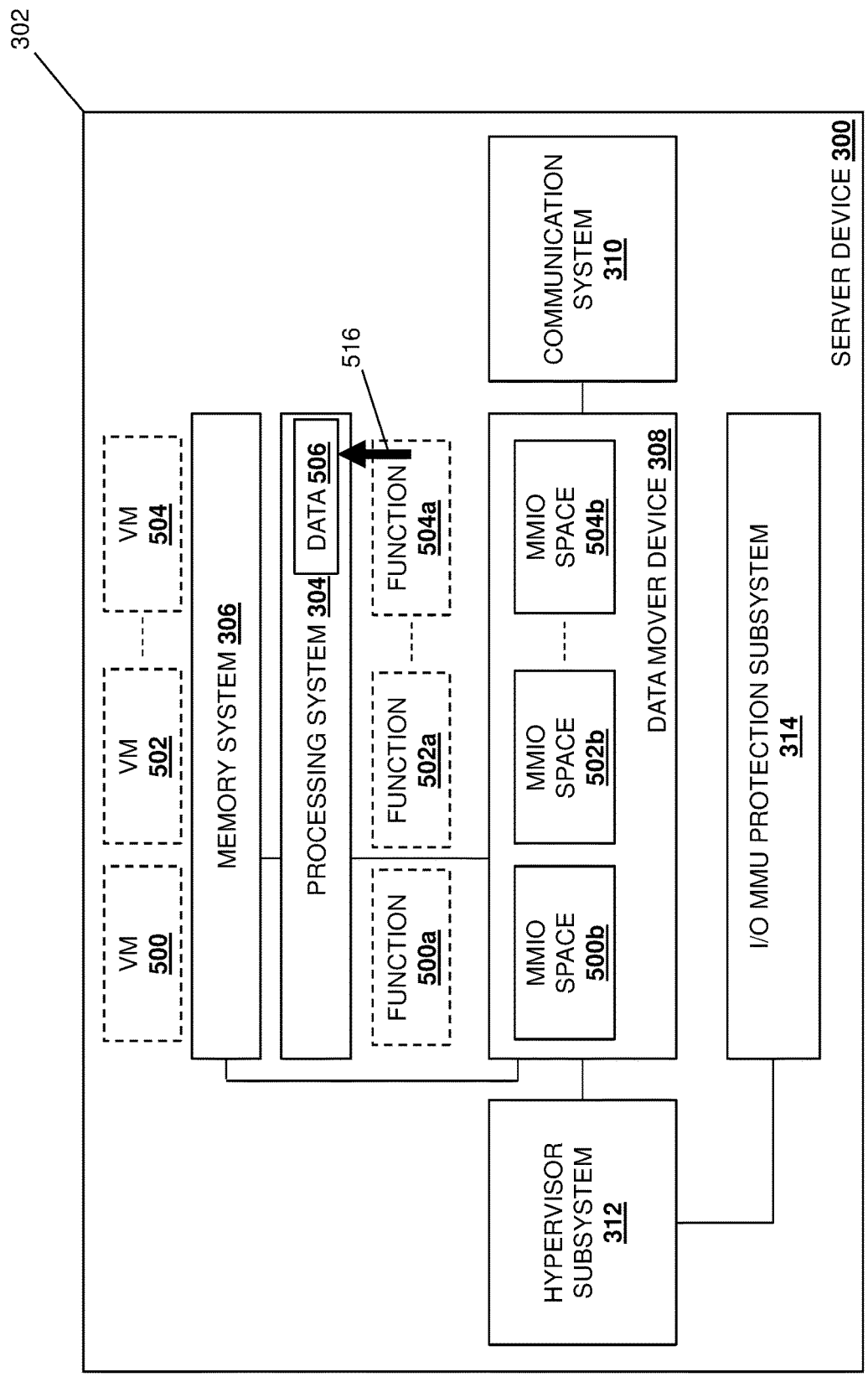
FIG. 5I is a schematic view illustrating an embodiment of the memory-fabric-based data-mover-enabled memory tiering system in the server device of FIG. 3 operating during the method of FIG. 4.

The method 400 then proceeds to block 406 where the data mover device provides the data for use with the compute context. FIGS. 5H and 5I illustrate how, in an embodiment of block 406, the function 504a may perform retrieval and provisioning operations 516 to retrieve the data 506 received by the data mover device 308 at block 404, and provide the data 506 for use with the virtual machine 504. In the specific example illustrated in FIGS. 5H and 5I, the receiving of the data 506 at the MMIO space 504b provides the function 504a access to the data 506, and the function 504a is configured to provide that data 506 to the processing system 304 so that the processing system 304 may provide the data 506 in its registers (e.g., as per the data access request 508 that includes the mov instruction discussed above.) As will be appreciated by one of skill in the art in possession of the present disclosure, the processing system 304 may then use the data 506 (e.g., stored in its registers) to provide the VM 504. However, one of skill in the art in possession of the present disclosure will recognize that the function 504a/data mover device 308 may be configured to provide data retrieved from the first memory subsystem for use with the VM 504 in a variety of manners that will fall within the scope of the present disclosure as well.

The method 400 then proceeds to decision block 408 where it is determined whether the data has been retrieved and provided for the compute context at a frequency that is outside a memory tiering frequency range. In an embodiment, at decision block 406, the data mover engine in the data mover device 308 may operate to track, record, and/or otherwise monitor the retrieval and provisioning of the data 506 to the VM 504 by, for example, incrementing a data-usage counter stored in the data mover database 308a that is accessible to the data mover device 308, and then determining whether that data-usage counter indicates a data retrieval and provisioning frequency that is outside a memory tiering frequency range. As would be appreciated by one of skill in the art in possession of the present disclosure, the data mover device 308 may utilize the data mover database 308a to track the use of any data that is stored in the memory fabric and utilized by any of the VMs 502, 504, and up to 506, and thus may include any number of corresponding data usage counters similar to the data usage counter described above for the data 506 and VM 504. In an embodiment, memory tiering frequency ranges associated with any data/VM combination may be defined (e.g., by a user of the VMs and/or server device) based on a variety of factors that would be apparent to one of skill in the art in possession of the present disclosure.

For example, a memory tiering frequency range may be provided by memory tiering frequency information that that includes a minimum memory tiering frequency and a maximum memory tiering frequency for a particular memory tier (e.g., provided by one or more memory subsystems). In the examples provided below, the memory tiering frequency range is associated with memory tiering frequencies for data that should be stored in a first memory subsystem, while memory tiering frequencies that fall below the minimum memory tiering frequency result in that data being stored in a memory subsystem with lower performance memory subsystem characteristics, and memory tiering frequencies that fall above the maximum memory tiering frequency result in that data being stored in a memory subsystem with higher performance memory subsystem characteristics. However, one of skill in the art in possession of the present disclosure will recognize that the memory tiering frequency range provided herein is a simplified version of a memory tiering techniques provided for purposes of the discussion of the example below. As such, one of skill in the art in possession of the present disclosure will recognize that multiple memory tiering frequency ranges may be utilized, and/or that different memory tiering techniques will fall within the scope of the present disclosure as well.

If, at decision block 406, it is determined that the data has not been retrieved and provided for the compute context at a frequency that is outside a memory tiering frequency range, the method 400 returns to block 402. For example, at decision block 406, the data mover engine in the data mover device 308 may operate to determine (e.g., based on the usage counter discussed above) that the retrieval and provisioning of the data 506 for use with the VM 504 is at a frequency that is not outside of the memory tiering frequency range for the memory system 210 (i.e., the first memory system) and, in response, may return to block 402. As such, the method 400 may loop through blocks 402, 404, 406, and 408 such that the data mover device 308 retrieves and provides the data 506 to the compute context/VM 504 in response to data access requests from the VM 504 as long as the data mover device 308 does not determine that that data 506 has been retrieved and provided to the computer context/VM 504 at a frequency that is outside the memory tiering frequency range for the first memory subsystem/memory system 210.

If, at decision block 406, it is determined that the data has been retrieved and provided for the compute context at a frequency that is outside the memory tiering frequency range, the method 400 proceeds to block 410 where the data mover device moves the data from the first memory subsystem in the memory fabric to a second memory subsystem in the memory fabric. For example, at decision block 406, the data mover engine in the data mover device 308 may operate to determine (e.g., based on the usage counter discussed above) that the retrieval and provisioning of the data 506 for use with the VM 504 is at a frequency that is outside of the memory tiering frequency range for the memory system 210 (i.e., the first memory system) and, in response, may proceed to block 410. In this example, at decision block 406 the data mover engine in the data mover device 308 determines (e.g., based on the usage counter discussed above) that the retrieval and provisioning of the data 506 for use with the VM 504 is at a frequency that is above the maximum tiering frequency that provides the memory tiering frequency range for the memory system 210 (i.e., the first memory system).

As such, at block 410, the data mover engine in the data mover device 308 may operate to move the data from the memory system 210/first memory subsystem in the memory fabric to a second memory subsystem in the memory fabric that has higher performance memory characteristics relative to the memory system 210/first memory subsystem. As would be appreciated by one of skill in the art in possession of the present disclosure, the data mover device 308 may operate during memory initialization operations (e.g., that are performed during server device power on, reset, reboot, and/or other initialization) to retrieve, learn, and/or otherwise identify and store information about the memory subsystems in the memory fabric (e.g., in the data mover database 308a), which may include the physical locations of those memory subsystems, memory characteristics for those memory subsystems, and/or any of memory subsystem information known in the art. In an embodiment, in response to identifying that the retrieval and provisioning of the data 506 for use with the VM 504 is at a frequency that is above the maximum tiering frequency, the data move engine in the data mover device 308 may identify a second memory subsystem in the memory fabric that includes higher performance memory characteristics relative to the memory system 210/first memory subsystem. In the examples below, the data move engine in the data mover device 308 identifies the memory system 306 as the second memory subsystem in the memory fabric that includes higher performance memory characteristics relative to the memory system 210/first memory subsystem due to, for example, the proximity of that memory system 306/second memory subsystem to the processing system 304/VM 504 (i.e., in the same server device 300) relative to the memory system 210/first memory subsystem (i.e., in a network-connected memory system 210), which one of skill in the art in possession of the present disclosure will recognize may be associated with the memory system 306/second memory subsystem having lower memory access latency, higher memory access bandwidth, and/or other higher performance memory characteristics relative to the memory system 210/first memory subsystem.

However, one of skill in the art in possession of the present disclosure will recognize that memory subsystems may be determined to have higher performance memory characteristics that other memory subsystem due to factors other than physical proximity. For example, memory device types included in memory subsystems may provide some memory subsystems with higher performance memory characteristics relative to other memory subsystems including the lower memory access latency and higher memory access bandwidth discussed above. Furthermore, higher performance memory characteristics may be provided by memory subsystems that have lower degradation properties relative to other memory subsystems (e.g., flash memory devices typically have higher degradation properties relative to other memory device types, and thus memory subsystems without flash memory devices may be considered to have higher performance memory characteristics relative to memory subsystems with flash memory devices). However, while a few examples of identifying higher performance characteristic memory subsystems has been described, one of skill in the art in possession of the present disclosure will recognize that a variety of factors may be considered to identify higher performance characteristic memory subsystems while remaining within the scope of the present disclosure as well.

Figure 5J:
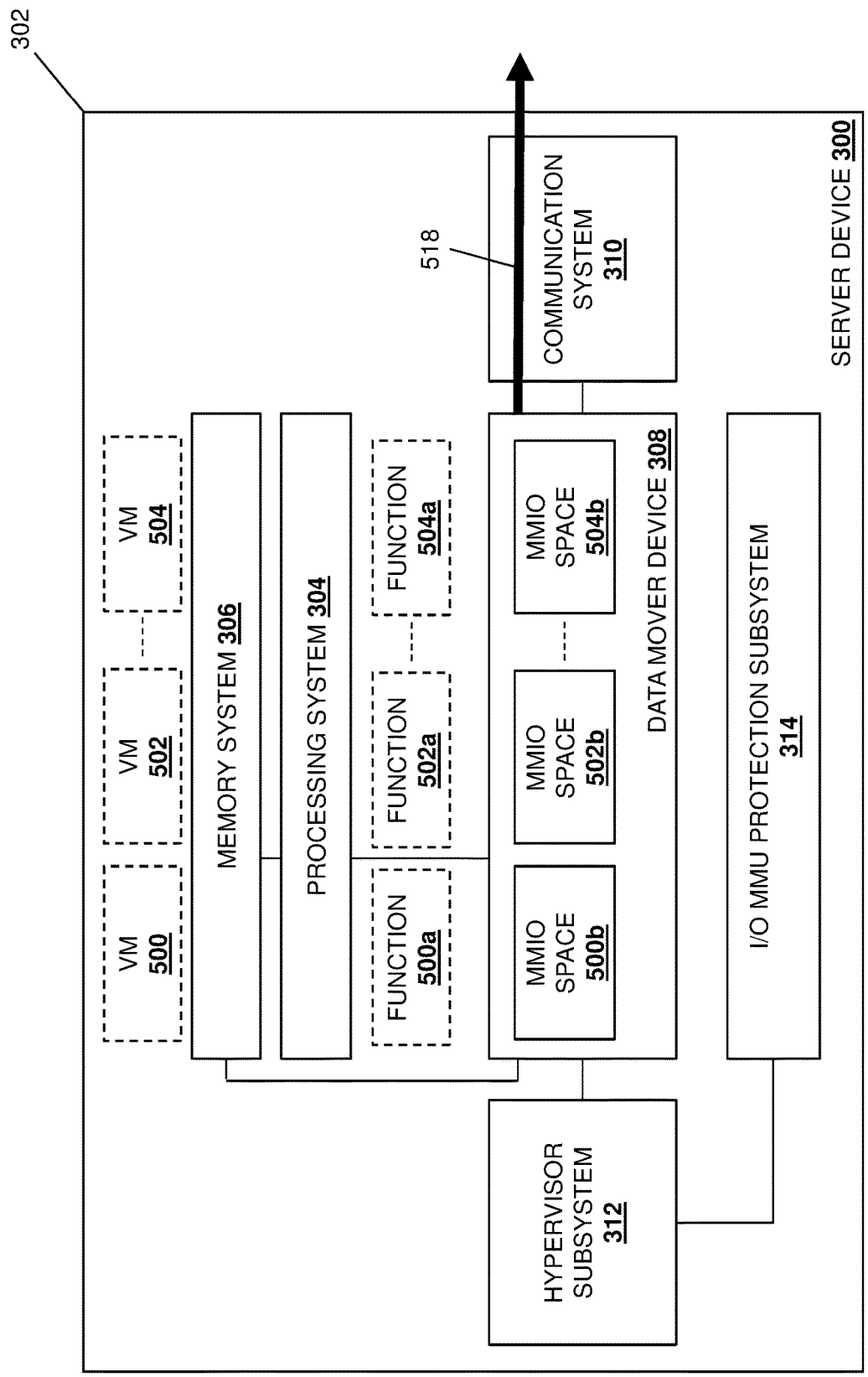
FIG. 5J is a schematic view illustrating an embodiment of the memory-fabric-based data-mover-enabled memory tiering system in the server device of FIG. 3 operating during the method of FIG. 4.
Figure 5K:
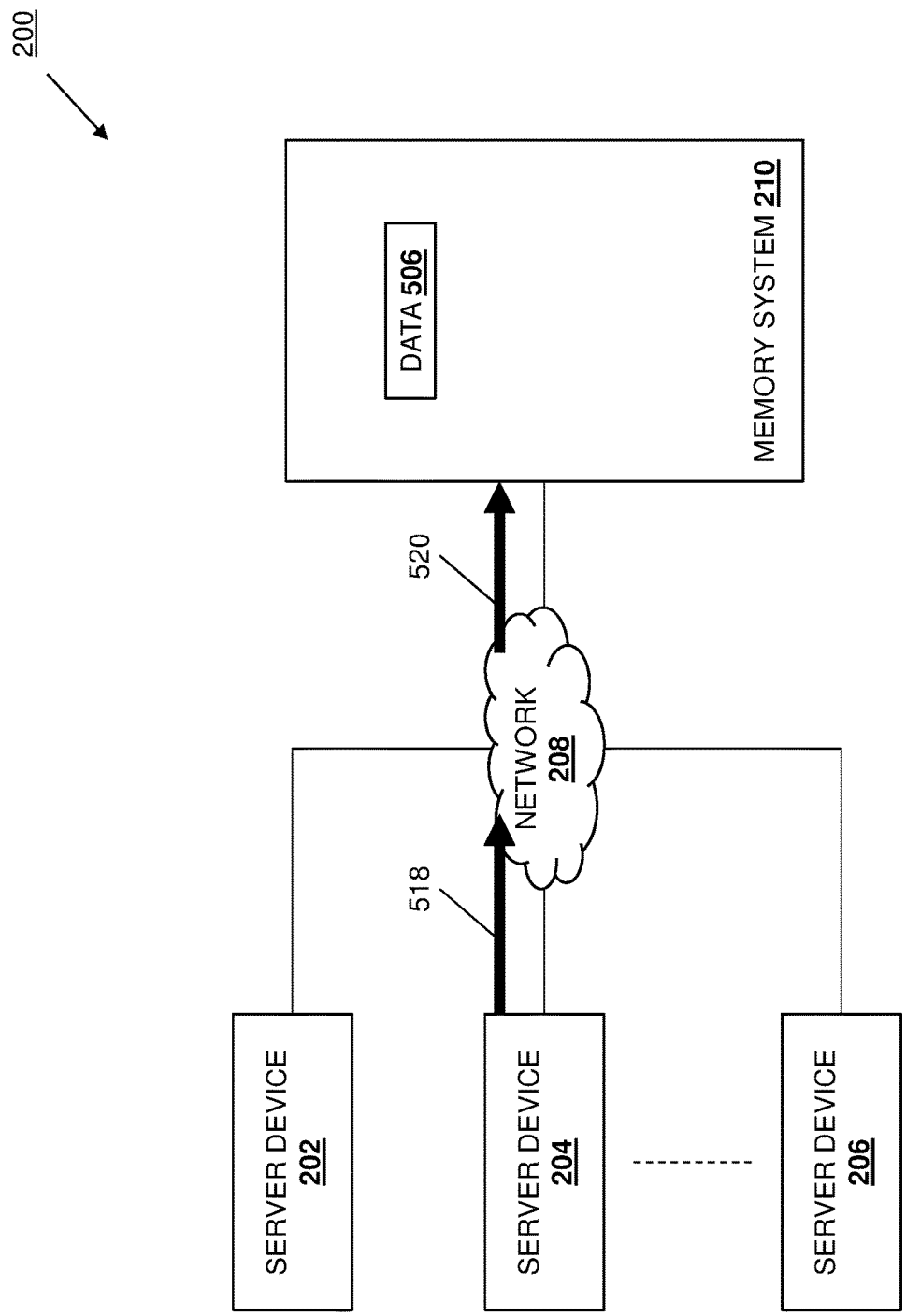
FIG. 5K is a schematic view illustrating an embodiment of the networked system of FIG. 2 operating during the method of FIG. 4.

For example, FIG. 5J illustrates how the data mover engine in the data mover device 308 may generate a memory fabric request 518 that may identify the data 506 determined at decision block 406 to have been accessed at a frequency that is outside the memory tiering frequency range, and that is configured to provide for the data movement discussed below. FIGS. 5J and 5K illustrate the data mover engine in the data mover device 308 issuing the memory fabric request 518 that is transmitted (e.g., via the communication system 510) to the network 208, and that requests for the movement of the data 506 from the memory system 210/first memory subsystem to the memory system 206/second memory subsystem identified as discussed above. In a specific example, the memory fabric request 518 may include a Gen-Z request from a Gen-Z ZMMU requester in the communication system 310, although other memory fabric request techniques utilizing other memory fabrics will fall within the scope of the present disclosure as well.

Figure 5L:
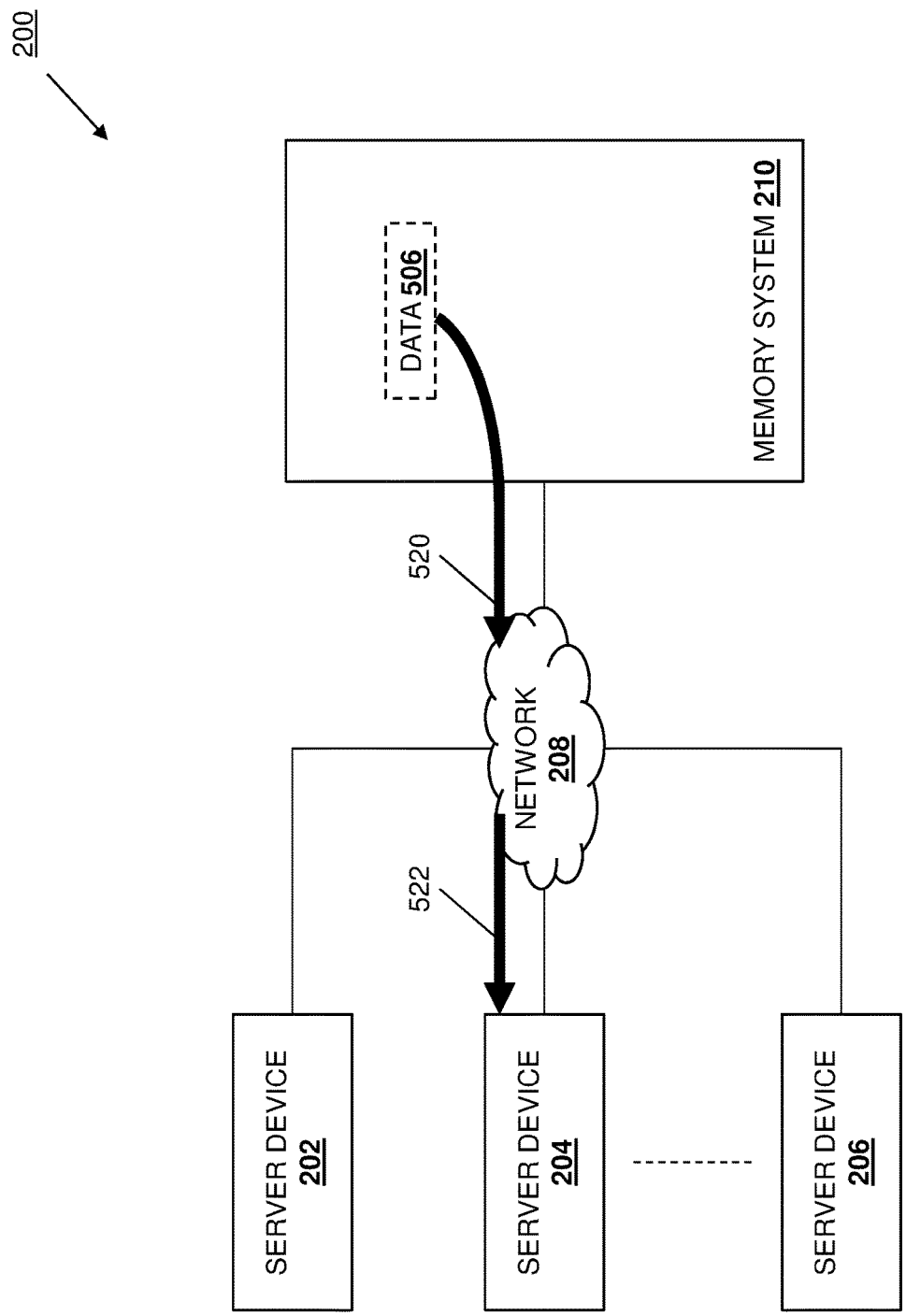
FIG. 5L is a schematic view illustrating an embodiment of the networked system of FIG. 2 operating during the method of FIG. 4.
Figure 5M:
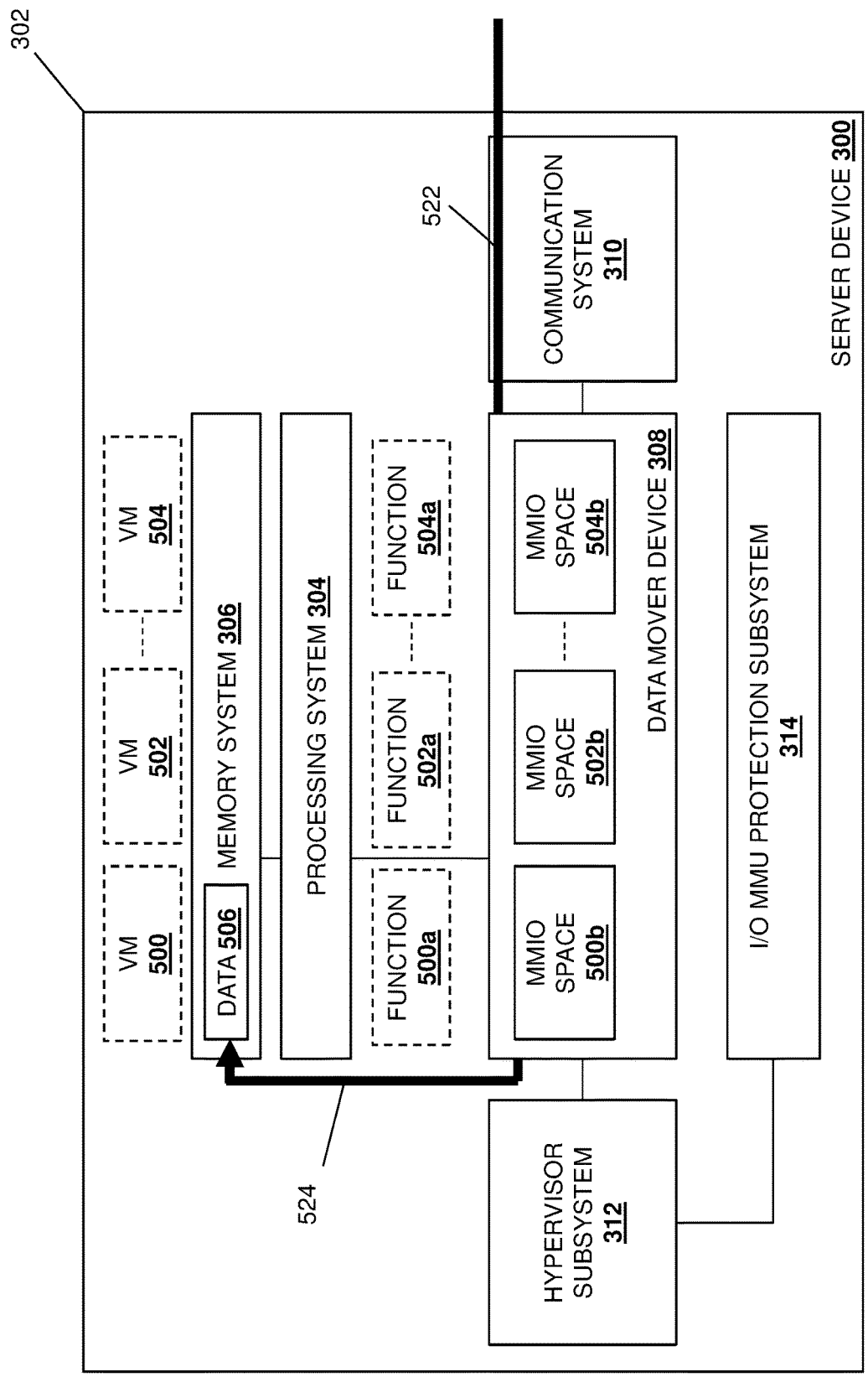
FIG. 5M is a schematic view illustrating an embodiment of the memory-fabric-based data-mover-enabled memory tiering system in the server device of FIG. 3 operating during the method of FIG. 4.

As illustrated in FIGS. 5K, 5L, and 5M, the memory fabric request 518 transmitted to the network 208 may cause the movement of the data 506 that is stored in the memory system 210/first memory subsystem to the memory system 206/second memory subsystem. For example, a switch device and/or bridge device that provides at least a portion of the network 208 may receive the memory fabric request 518 and in response, perform memory fabric operations 520 that operate to move the data 506 stored in the memory system 210, and provide that data 506 in a memory fabric response 522 to the data mover device 308. In a specific example, the network 208 may include a Gen-Z switch device and/or Gen-Z bridge device that provides a Gen-Z ZMMU responder that receives the memory fabric request 518/Gen-Z request issued by the Gen-Z ZMMU requester in the communication system 310, utilizes information in the memory fabric request to identify the data 506, and moves that data 506 in a Gen-Z response to the communication system 310/Gen-Z requester such that it is provided to the data mover device 308, although other memory fabric response techniques utilizing other memory fabrics will fall within the scope of the present disclosure as well. As such, at block 410, the data mover device 308 may receive the data 506 that was included in the memory fabric response 522 from the Gen-Z requester included in the communication system 310, and perform a memory fabric storage operation 524 that operates to store the data 506 in the memory system 306, although one of skill in the art in possession of the present disclosure will recognize that other memory fabrics may utilize other memory fabric techniques to move data via the data mover device 308 while remaining within the scope of the present disclosure as well.

The method 400 then proceeds to block 412 where the data mover device causes the compute-context-memory-fabric mapping to be modified to map the computer context to the second memory subsystem. In an embodiment, at block 412, the data mover engine in the data mover device 308 operates to cause the compute-context-memory-fabric mapping that maps the VM 504/compute context to the memory system 210/first memory subsystem to be modified to map the VM 504/compute context to the memory system 206/second memory subsystem. Continuing with the example provided above, at block 412 the data mover engine in the data mover device 308 may send a mapping modification instruction to the hypervisor subsystem 312 that causes the hypervisor subsystem 312 to modify (e.g., in the data mover database 308a) the compute-context-memory-fabric mapping that maps physical address space that defines the memory system 210 (or portion the memory system 210 that provides the first memory subsystem) in the memory fabric to the virtual address space (e.g., the MMIO space 504b) that is allocated to the VM 504 in order to provide a modified compute-context-memory-fabric mapping that maps physical address space that defines the memory system 206 (or portion the memory system 206 that provides the second memory subsystem) in the memory fabric to the virtual address space (e.g., the MMIO space 504b) that is allocated to the VM 504.

Figure 5N:
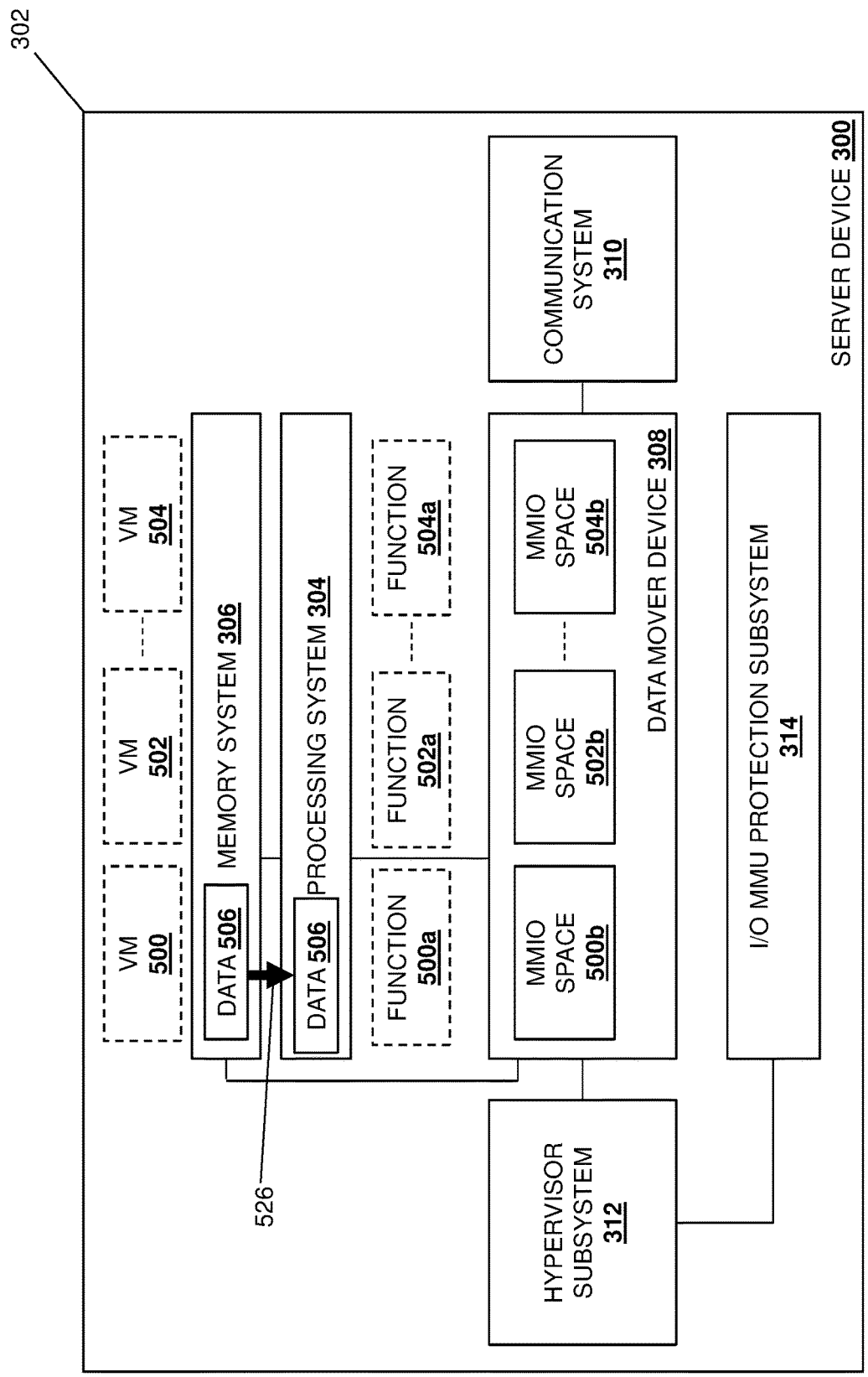
FIG. 5N is a schematic view illustrating an embodiment of the memory-fabric-based data-mover-enabled memory tiering system in the server device of FIG. 3 operating during the method of FIG. 4.

The method 400 then returns to block 402. FIG. 5N illustrates how blocks 402, 404, and 406 of subsequent iterations of the method 400 may be performed in a substantially similar manners as described above, but with the data 506 is that is now stored in the memory system 306. As such, continuing with the example provided above, a data access request by the VM 504/processing system 304 that requests the data 506 for registers in the processing system 304 will result in retrieval and provisioning operations 526 that provide that data 506 to the processing system 304 for provisioning in the registers in the processing system 304, and one of skill in the art in possession of the present disclosure will recognize how the proximity of the memory system 306 to the processing system 304/VM 504 provides for the retrieval and provisioning of the data 506 with reduced memory access latency, increased memory access bandwidth, and/or other memory access enhancements relative to when that data 506 was stored in the memory system 210.

In other unillustrated examples of decision block 406, the data mover engine in the data mover device 308 may determine (e.g., based on the usage counter discussed above) that the retrieval and provisioning of data for use with the VM 504 is at a frequency that is below the minimum tiering frequency that provides the memory tiering frequency range for the first memory system. As such, at block 410, the data mover engine in the data mover device 308 may operate to move the data from the first memory subsystem in the memory fabric to a second memory subsystem in the memory fabric that has lower performance memory characteristics relative to the first memory subsystem. In an embodiment, in response to identifying that the retrieval and provisioning of data for use with a VM is at a frequency that is below the minimum tiering frequency, the data mover engine in the data mover device 308 may identify a second memory subsystem in the memory fabric that includes lower performance memory characteristics relative to the first memory subsystem. In the examples below, the data move engine in the data mover device 308 identifies the second memory subsystem in the memory fabric that includes lower performance memory characteristics relative to the first memory subsystem due to, for example, the proximity of that second memory subsystem to the processing system 304/VM (i.e., in a network-connected memory system) relative to the first memory subsystem (i.e., in the same server device 300), which one of skill in the art in possession of the present disclosure will recognize results in the second memory subsystem having higher memory access latency, lower memory access bandwidth, and/or other lower performance memory characteristics relative to the first memory subsystem.

However, one of skill in the art in possession of the present disclosure will recognize that memory subsystems may be determined to have lower performance memory characteristics that other memory subsystem due to factors other than proximity. For example, memory device types included in memory subsystems may provide some memory subsystems with lower performance memory characteristics than other memory subsystems including the higher memory access latency and lower memory access bandwidth discussed above. Furthermore, lower performance memory characteristics may be provided by memory subsystems that have higher degradation properties relative to other memory subsystems (e.g., flash memory devices typically have higher degradation properties relative to other memory device types, and thus memory subsystems with flash memory devices may be considered to have lower performance memory characteristics relative to memory subsystems without flash memory devices). However, while a few examples of identifying lower performance characteristic memory subsystems has been described, one of skill in the art in possession of the present disclosure will recognize that a variety of factors may be considered to identify lower performance characteristic memory subsystems while remaining within the scope of the present disclosure as well.

As such, the data mover engine in the data mover device 308 may operate to move the data, which was determined at decision block 406 to have been accessed at a frequency that is outside the memory tiering frequency range, from the first memory subsystem in the memory fabric to the second memory subsystem in the memory fabric. For example, the movement of data from the relatively higher performance memory system 306 discussed above to the relatively lower performance memory system 210 discussed above may include the data mover engine in the data mover device 308 moving that data from the memory system 306, providing it in a memory fabric request that is transmitted to the network 208, with a switch or bridge device in the network 208 providing that data for storage in the memory system 210, which one of skill in the art in possession of the present disclosure will recognize may be performed using similar techniques to those described above.

Subsequently, at block 412, the data mover device may cause the compute-context-memory-fabric mapping to be modified to map the computer context to the second memory subsystem in substantially the same manner as discussed above, and the method 400 may then returns to block 402. As such, subsequent iterations of the method 400 may be performed in a substantially similar manner as described above, and one of skill in the art in possession of the present disclosure will recognize how the proximity of the second memory subsystem/memory system 210 provides for the retrieval and provisioning of the data with increased memory access latency, reduced memory access bandwidth, and/or other lower performance memory access characteristics relative to when that data was stored in first memory subsystem/memory system 206, but with the advantage that the movement of that data freeing up space in the higher performance first memory subsystem/memory system 206 for data that is utilized at a higher frequency.

Thus, systems and methods have been described that provide for a data mover device that monitors the retrieval and provisioning of data stored in a first memory subsystem included in a memory fabric to a virtual machine provided by a processing system in a server device. When the frequency of the retrieval and provisioning of the data stored in the first memory subsystem to the virtual machine is determined to be outside a memory tiering frequency range, the data mover device may move that data to a different memory subsystem included in the memory fabric. As such, data used with the virtual machine above the memory tiering frequency range is moved to a second memory subsystem that has higher performance memory characteristics relative to the first memory subsystem (e.g., the second memory subsystem may be physical closer to the virtual machine and, as such, may be associated with reduced latency memory access, higher bandwidth memory access, and/or other enhance memory access characteristics known in the art.) Similarly, data used with the virtual machine below the memory tiering frequency range is moved to a second memory subsystem that has lower performance memory characteristics relative to the first memory subsystem. As will be appreciated by one of skill in the art in possession of the present disclosure, the data-mover-enabled memory tiering operations described in the present disclosure do not require the use of network protocols in order to access, copy, and move data that is stored outside the server device, or dedicated software stacks executed by the processing system in the server device in order to perform the memory tiering operations, reducing the amount of programming needed in order to enable memory tiering, while freeing processing system cycles for relatively higher value processing operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory tiering system, comprising:
a memory fabric including a plurality of memory subsystems;
a processing system that is configured to provide at least one compute context; and
a data mover device that couples the processing system to the memory fabric, wherein the data mover device is configured to:
receive, at a plurality of different first times from a first compute context provided by the processing system, a first data access request for first data at a Memory Mapped Input/Output (MMIO) space via a data mover function, wherein the MMIO space and the data mover function are allocated to the first compute context;
retrieve, at each of the plurality of different first times from a first memory subsystem that is included in the memory fabric and in response to the first data access request, the first data based on a first-compute-context-memory-fabric mapping that maps the first compute context to the first memory subsystem;
provide, at each of the plurality of different first times, the first data to the processing system for use with the first computer context; and
determine that the first data has been retrieved and provisioning for use with the first compute context above a first memory tiering frequency over the plurality of different first times and, in response:
move the first data from the first memory subsystem in the memory fabric to a second memory subsystem in the memory fabric that includes higher performance memory characteristics relative to the first memory subsystem; and
cause the first-compute-context-memory-fabric mapping to be modified to provide a modified first-compute-context-memory-fabric mapping that maps the first compute context to the second memory subsystem.

2. The system of claim 1, wherein the data mover device is configured to:
receive, at a second time that is subsequent to the plurality of different first times and from the first compute context provided by the processing system, a second data access request for the first data;
retrieve, at the second time from the second memory subsystem that is included in the memory fabric and in response to the second data access request, the second data based on the modified first-compute-context-memory-fabric mapping that maps the first compute context to the second memory subsystem; and
provide, at the second time, the first data to the processing system for use with the first computer context.

3. The system of claim 1, wherein the data mover device is configured to:

receive, at a plurality of different second times from a second compute context provided by the processing system, a second data access request for second data;
retrieve, at each of the plurality of different second times from a third memory subsystem that is included in the memory fabric and in response to the second data access request, the second data based on a second-compute-context-memory-fabric mapping that maps the second compute context to the third memory subsystem;
provide, at each of the plurality of different second times, the second data to the processing system for use with the second computer context; and
determine that the second data has been retrieved and provisioning for use with the second compute context below a second memory tiering frequency over the plurality of different second times and, in response:
move the second data from the third memory subsystem in the memory fabric to a fourth memory subsystem in the memory fabric that includes lower performance memory characteristics relative to the third memory subsystem; and
cause the second-compute-context-memory-fabric mapping to be modified to provide a modified second-compute-context-memory-fabric mapping that maps the second compute context to the fourth memory subsystem.

4. The system of claim 1, further comprising:
a hypervisor subsystem that is provided by the processing system and that is coupled to the data mover device, wherein the hypervisor subsystem is configured to:
create the first-compute-context-memory-fabric mapping; and
modify the first-compute-context-memory-fabric mapping to provide the modified first-compute-context-memory-fabric mapping.

5. The system of claim 1, wherein the first-compute-context-memory-fabric mapping maps first physical address space that defines the first memory subsystem to virtual address space that is allocated to the first compute context, and wherein the modified first-compute-context-memory-fabric mapping maps second physical address space that defines the second memory subsystem to the virtual address space that is allocated to the first compute context.

6. An Information Handling System (IHS), comprising:
a data mover processing system; and
a data mover memory system that is coupled to the data mover processing system and that includes instructions that, when executed by the data mover processing system, cause the data mover processing system to provide a data mover engine that is configured to:
receive, at a plurality of different first times from a first compute context, a first data access request for first data at a Memory Mapped Input/Output (MMIO) space via a data mover function, wherein the MMIO space and the data mover function are allocated to the first compute context;
retrieve, at each of the plurality of different first times from a first memory subsystem that is included in a memory fabric and in response to the first data access request, the first data based on a first-compute-context-memory-fabric mapping that maps the first compute context to the first memory subsystem;
provide, at each of the plurality of different first times, the first data for use with the first computer context;
determine that the first data has been retrieved and provisioning for use with the first compute context above a first memory tiering frequency over the plurality of different first times and, in response:
    move the first data from the first memory subsystem in the memory fabric to a second memory subsystem in the memory fabric that includes higher performance memory characteristics relative to the first memory subsystem; and
    cause the first-compute-context-memory-fabric mapping to be modified to provide a modified first-compute-context-memory-fabric mapping that maps the first compute context to the second memory subsystem.

7. The IHS of claim 6, wherein the data mover engine is configured to:
receive, at a second time that is subsequent to the plurality of different first times and from the first compute context, a second data access request for the first data;
retrieve, at the second time from the second memory subsystem that is included in the memory fabric and in response to the second data access request, the second data based on the modified first-compute-context-memory-fabric mapping that maps the first compute context to the second memory subsystem;
provide, at the second time, the first data for use with the first computer context.

8. The IHS of claim 6, wherein the data mover engine is configured to:
receive, at a plurality of different second times from a second compute context, a second data access request for second data;
retrieve, at each of the plurality of different second times from a third memory subsystem that is included in the memory fabric and in response to the second data access request, the second data based on a second-compute-context-memory-fabric mapping that maps the second compute context to the third memory subsystem;
provide, at each of the plurality of different second times, the second data for use with the second computer context; and
determine that the second data has been retrieved and provisioning for use with the second compute context below a second memory tiering frequency over the plurality of different second times and, in response:
    move the second data from the third memory subsystem in the memory fabric to a fourth memory subsystem in the memory fabric that includes lower performance memory characteristics relative to the third memory subsystem; and
    cause the second-compute-context-memory-fabric mapping to be modified to provide a modified second-compute-context-memory-fabric mapping that maps the second compute context to the fourth memory subsystem.

9. The IHS of claim 6, wherein the first compute context is a virtual machine.

10. The IHS of claim 9, further comprising:
a hypervisor subsystem that is coupled to the data mover processing system, wherein the hypervisor subsystem is configured to:
    create the first-compute-context-memory-fabric mapping that maps the virtual machine to the first memory subsystem; and
    modify the first-compute-context-memory-fabric mapping to provide the modified first-compute-context-memory-fabric mapping that maps the virtual machine to the second memory subsystem.

11. The IHS of claim 6, wherein the first-compute-context-memory-fabric mapping maps first physical address space that defines the first memory subsystem to virtual address space that is allocated to the first compute context, and wherein the modified first-compute-context-memory-fabric mapping maps second physical address space that defines the second memory subsystem to the virtual address space that is allocated to the first compute context.

12. A method for using a data mover device to perform memory-fabric-based memory tiering, comprising:
receiving, by a data mover device at a plurality of different first times from a first compute context, a first data access request for first data at a Memory Mapped Input/Output (MMIO) space via a data mover function, wherein the MMIO space and the data mover function are allocated to the first compute context;
retrieving, by the data mover device at each of the plurality of different first times from a first memory subsystem that is included in a memory fabric and in response to the first data access request, the first data based on a first-compute-context-memory-fabric mapping that maps the first compute context to the first memory subsystem;
providing, by the data mover device at each of the plurality of different first times, the first data for use with the first computer context;
determining, by the data mover device, that the first data has been retrieved and provisioning for use with the first compute context above a first memory tiering frequency over the plurality of different first times and, in response:
    moving the first data from the first memory subsystem in the memory fabric to a second memory subsystem in the memory fabric that includes higher performance memory characteristics relative to the first memory subsystem; and
    causing the first-compute-context-memory-fabric mapping to be modified to provide a modified first-compute-context-memory-fabric mapping that maps the first compute context to the second memory subsystem.

13. The method of claim 12, further comprising:
receiving, by the data mover device at a second time that is subsequent to the plurality of different first times and from the first compute context, a second data access request for the first data;
retrieving, by the data mover device at the second time from the second memory subsystem that is included in the memory fabric and in response to the second data access request, the second data based on the modified first-compute-context-memory-fabric mapping that maps the first compute context to the second memory subsystem;
providing, by the data mover device at the second time, the first data for use with the first computer context.

14. The method of claim 12, further comprising:
receiving, by the data mover device at a plurality of different second times from a second compute context, a second data access request for second data;
retrieving, by the data mover device at each of the plurality of different second times from a third memory subsystem that is included in the memory fabric and in response to the second data access request, the second data based on a second-compute-context-memory-fabric mapping that maps the second compute context to the third memory subsystem;

providing, by the data mover device at each of the plurality of different second times, the second data for use with the second computer context; and determining, by the data mover device, that the second data has been retrieved and provisioning for use with the second compute context below a second memory tiering frequency over the plurality of different second times and, in response:

moving the second data from the third memory subsystem in the memory fabric to a fourth memory subsystem in the memory fabric that includes lower performance memory characteristics relative to the third memory subsystem; and causing the second-compute-context-memory-fabric mapping to be modified to provide a modified second-compute-context-memory-fabric mapping that maps the second compute context to the fourth memory subsystem.

15. The method of claim 12, wherein the first compute context is a virtual machine.

16. The method of claim 15, further comprising:

creating, by a hypervisor subsystem that is coupled to the data mover device, the first-compute-context-memory-fabric mapping that maps the virtual machine to the first memory subsystem; and modifying, by a hypervisor subsystem, the first-compute-context-memory-fabric mapping to provide the modified first-compute-context-memory-fabric mapping that maps the virtual machine to the second memory subsystem.

17. The method of claim 12, wherein the first-compute-context-memory-fabric mapping maps first physical address space that defines the first memory subsystem to virtual address space that is allocated to the first compute context, and wherein the modified first-compute-context-memory-fabric mapping maps second physical address space that defines the second memory subsystem to the virtual address space that is allocated to the first compute context.

* * * * *